US011240783B2

(12) United States Patent
Lee et al.

(10) Patent No.: US 11,240,783 B2
(45) Date of Patent: Feb. 1, 2022

(54) V2X TRANSMISSION RESOURCE SELECTING METHOD IMPLEMENTED BY TERMINAL IN WIRELESS COMMUNICATION SYSTEM AND TERMINAL USING SAME

(71) Applicant: LG Electronics Inc., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 514 days.

(21) Appl. No.: 16/082,228

(22) PCT Filed: Mar. 6, 2017

(86) PCT No.: PCT/KR2017/002411
§ 371 (c)(1),
(2) Date: Sep. 4, 2018

(87) PCT Pub. No.: WO2017/150956
PCT Pub. Date: Sep. 8, 2017

(65) Prior Publication Data

US 2020/0296692 A1 Sep. 17, 2020

Related U.S. Application Data

(60) Provisional application No. 62/423,738, filed on Nov. 17, 2016, provisional application No. 62/416,669,
(Continued)

(51) Int. Cl.
*H04W 72/02* (2009.01)
*H04W 4/40* (2018.01)
(Continued)

(52) U.S. Cl.
CPC ............ *H04W 72/02* (2013.01); *H04W 4/40* (2018.02); *H04W 8/24* (2013.01); *H04W 24/10* (2013.01);
(Continued)

(58) Field of Classification Search
CPC ......... H04W 4/40; H04W 8/24; H04W 24/10; H04W 52/346; H04W 52/383;
(Continued)

(56) References Cited

U.S. PATENT DOCUMENTS 9,531,494 B2 12/2016 Somasundaram et al.
9,942,879 B2 4/2018 Kim et al.
(Continued)

FOREIGN PATENT DOCUMENTS

EP 3142426 A1 * 3/2017 .......... H04W 52/383
WO WO2015046973 4/2015
(Continued)

OTHER PUBLICATIONS

U.S. Office Action in U.S. Appl. No. 16/082,180, dated Feb. 13, 2020, 16 pages.
(Continued)

*Primary Examiner* — Brian P Cox
(74) *Attorney, Agent, or Firm* — Fish & Richardson P.C.

(57) ABSTRACT

The present invention provides a V2X operation method implemented by a V2X (vehicle-to-X) terminal in a wireless communication system, the method characterized by: if a V2X transmission operation and a wide area network (WAN) transmission operation overlap in a time domain, determining whether or not the V2X transmission operation and the WAN transmission operation are performed on a same carrier; and performing the V2X transmission operation on the basis of the determination, wherein, if the V2X transmission operation and the WAN transmission operation
(Continued)

Frequency (f)
$f_1$ WAN transmission WAN carrier
$f_0$ V2X transmission V2X carrier
$t_0$ Time (t)
2X transmission operation and WAN transmission operation overlap in time domain are performed on different carriers, the V2X transmission operation is performed on the basis of a transmission power applied to the V2X transmission operation or, if the V2X transmission operation and the WAN transmission operation are performed on the same carrier, the V2X transmission operation is performed on the basis of a priority applied to the V2X transmission operation.

10 Claims, 26 Drawing Sheets

Related U.S. Application Data filed on Nov. 2, 2016, provisional application No. 62/403,028, filed on Sep. 30, 2016, provisional application No. 62/401,743, filed on Sep. 29, 2016, provisional application No. 62/379,221, filed on Aug. 24, 2016, provisional application No. 62/350,727, filed on Jun. 16, 2016, provisional application No. 62/333,862, filed on May 10, 2016, provisional application No. 62/321,748, filed on Apr. 13, 2016, provisional application No. 62/316,574, filed on Apr. 1, 2016, provisional application No. 62/303,389, filed on Mar. 4, 2016.

(51) Int. Cl.

| | |
|---|---|
| ***H04W 88/06*** | (2009.01) |
| ***H04W 24/10*** | (2009.01) |
| ***H04W 8/24*** | (2009.01) |
| ***H04W 52/34*** | (2009.01) |
| ***H04W 52/38*** | (2009.01) |
| ***H04W 72/04*** | (2009.01) |
| ***H04W 72/10*** | (2009.01) |
| *H04W 92/18* | (2009.01) |

(52) U.S. Cl.
CPC ....... *H04W 52/346* (2013.01); *H04W 52/383* (2013.01); *H04W 72/044* (2013.01); *H04W 72/10* (2013.01); *H04W 88/06* (2013.01); *H04W 72/0446* (2013.01); *H04W 92/18* (2013.01); *Y02D 30/70* (2020.08)

(58) Field of Classification Search
CPC ............... H04W 72/02; H04W 72/044; H04W 72/0446; H04W 72/10; H04W 88/06; H04W 92/18; Y02D 30/70
See application file for complete search history.

(56) References Cited

U.S. PATENT DOCUMENTS

| | | | | |
|---|---|---|---|---|
| 10,057,076 | B2 | 8/2018 | Sartori et al. | |
| 10,383,147 | B2 | 8/2019 | Rajagopal et al. | |
| 10,477,527 | B2 | 11/2019 | Jiang et al. | |
| 2015/0043446 | A1 | 2/2015 | Tsirtsis et al. | |
| 2015/0327180 | A1 | 11/2015 | Ryu et al. | |
| 2015/0334760 | A1 | 11/2015 | Sartori et al. | |
| 2016/0044619 | A1 | 2/2016 | Ryu et al. | |
| 2016/0135148 | A1 | 5/2016 | Novlan et al. | |
| 2016/0219566 | A1* | 7/2016 | Jung | H04W 72/048 |
| 2016/0330729 | A1 | 11/2016 | Wei et al. | |
| 2016/0338121 | A1 | 11/2016 | Wietfeldt et al. | |
| 2017/0188381 | A1* | 6/2017 | Lopes Batista | H04W 8/005 |
| 2017/0188391 | A1 | 6/2017 | Rajagopal et al. | |
| 2017/0230918 | A1 | 8/2017 | Ryu et al. | |
| 2017/0238321 | A1 | 8/2017 | Sartori et al. | |
| 2017/0265198 | A1* | 9/2017 | Sorrentino | H04W 72/06 |
| 2018/0176871 | A1* | 6/2018 | Li | H04W 52/367 |
| 2018/0227971 | A1 | 8/2018 | Yasukawa et al. | |
| 2018/0317239 | A1 | 11/2018 | Wang et al. | |
| 2020/0084738 | A1 | 3/2020 | Nguyen | |

FOREIGN PATENT DOCUMENTS

| | | |
|---|---|---|
| WO | WO2015170934 | 11/2015 |
| WO | WO2017137009 | 8/2017 |

OTHER PUBLICATIONS

U.S. Appl. No. 62/296,320, filed 2016, 24 pages.

United States Office Action in U.S. Appl. No. 16/082,211, dated Dec. 9, 2020, 19 pages.

Kyocera, "Priority Handling for D2D Discovery/Communication During Cell Reselection," 3GPP TSG-RAN WG2 #88, dated Nov. 21, 2014, 8 pages.

Huawei et al., "QoS Support for V2X Transmission," 3GPP TSG-RAN WG2 #93, dated Feb. 15-19, 2016, 7 pages.

International Search Report in International Application No. PCT/KR2017/002411, dated May 23, 2017, 6 pages.

Qualcomm Incorporated, "Details of Sensing for V2V," R1-165910, 3GPP TSG-RAN WG1 #85, Nanjing, China, dated May 23-27, 2016, 19 pages.

U.S. Appl. No. 62/272,045, filed Dec. 28, 2015, Sridhar et al.

U.S. Appl. No. 62/294,541, filed Feb. 12, 2016, Sartori & Calcev.

U.S. Final Office Action in U.S. Appl. No. 16/082,180, dated Mar. 10, 2021, 21 pages.

U.S. Non-Final Office Action in U.S. Appl. No. 16/082,180, dated Jul. 8, 2021, 26 pages.

* cited by examiner

V2X TRANSMISSION RESOURCE SELECTING METHOD IMPLEMENTED BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2017/002411, filed on Mar. 6, 2017, which claims the benefit of U.S. Provisional Applications No. 62/303,389 filed on Mar. 4, 2016, No. 62/316,574 filed on Apr. 1, 2016, No. 62/321,748 filed on Apr. 13, 2016, No. 62/333,862 filed on May 10, 2016, No. 62/350,727 filed on Jun. 16, 2016, No. 62/379,221 filed on Aug. 24, 2016, No. 62/401,743 filed on Sep. 29, 2016, No. 62/403,028 filed on Sep. 30, 2016, No. 62/416,669 filed on Nov. 2, 2016 and No. 62/423,738 filed on Nov. 17, 2016, the contents of which are all hereby incorporated by reference herein in their entirety.

BACKGROUND OF THE INVENTION

Field of the Invention

The present invention relates to wireless communications and, more specifically, to a method of selecting a Vehicle-to-Everything (V2X) transmission resource by a user equipment (UE) in a wireless communication system and a UE using the same.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks.

Public safety networks have higher service requirements (reliability and security) than commercial communication networks and require direct signal transmission and reception, or D2D operation, between devices, especially when the coverage of cellular communications is insufficient or unavailable.

For example, D2D operation in general can have a variety of advantages in that it transmits and receives signals between nearby devices. For example, the D2D UE has high data rate and low delay and is capable of data communication. Also, the D2D operation can disperse the traffic to the base station, and can also expand the coverage of the base station if the UE performing the D2D operation acts as a repeater.

The D2D communication may expand and be applicable for signal transmission and reception between vehicles, and vehicle-related communication is referred to as Vehicle-To-Everything (V2X) communication.

The term "x" in V2X means pedestrian (communication between a vehicle and a device carried by an individual (e.g.) handheld terminal carried by a pedestrian, cyclist, driver or passenger)) (V2P), vehicle (communication between vehicles) (V2V), infrastructure/network (communication between a vehicle and a roadside unit (RSU)/network (e.g.) RSU is a transportation infrastructure entity (e.g.) an entity transmitting speed notifications) implemented in an eNB or a stationary UE)) (V2I/N A (V2P communication-related) device carried by a pedestrian (or human) will be referred to as "P-UE", and a (V2X-communication-related) device installed at a vehicle will be referred to as "V-UE". In addition, for example, the term "entity" in the present invention may be understood as a P-UE and/or a V-UE and/or RSU (network/infrastructure).

Meanwhile, in V2X communication, the question may be which resource to be selected when a P-UE transmits a V2X signal. The P-UE is sensitive to battery consumption, compared with a UE installed at a vehicle. In addition, in 2X communication, it may be important to periodically transmit a signal without interfering other UEs. A method for selecting a transmission resource by a P-UE needs to be determined in consideration of the above.

SUMMARY OF THE INVENTION

The present invention provides a V2X transmission resource selecting method implemented by a terminal in a wireless communication system, and a terminal using the same.

In an aspect, a Vehicle-to-X (V2X) operation method implemented by a V2X User Equipment (UE) in a wireless communication system is provided. The method may comprise when a V2X transmission operation and a wide area network (WAN) transmission operation overlap in a time domain, determine whether or not the V2X transmission operation and the WAN transmission operation are performed on a same carrier and perform the V2X transmission operation on the basis of the determination, if the V2X transmission operation and the WAN transmission operation are performed on different carriers, the V2X transmission operation is performed on the basis of transmission power applied to the V2X transmission operation, or, if the V2X transmission operation and the WAN transmission operation are performed on the same carrier, the V2X transmission operation may be performed on the basis of a priority applied to the V2X transmission operation.

If the V2X transmission operation and the WAN transmission operation are performed on the different carriers, the UE may first allocate transmission power to the V2X transmission operation and then allocate remaining power transmission power to the WAN transmission operation.

If the V2X transmission operation and the WAN transmission operation are performed on the different carriers and a ProSe prioiry per packet (PPPP) of a V2X message transmitted in the V2X transmission operation is greater than a threshold value, the UE may first allocate transmission power to the V2X transmission operation.

If the V2X transmission operation and the WAN transmission operation are performed on the different carriers and a PPPP of a V2X message transmitted in the V2X transmission operation is smaller than a threshold value, the UE may first allocate transmission power to the WAN transmission operation.

If the V2X transmission operation and the WAN transmission operation are performed on the different carriers and a PPPP of a V2X message transmitted in the V2X transmission operation is greater than a threshold value, the UE may allocate transmission power only to the V2X transmission operation and omits allocating transmission power to the WAN transmission operation.

If the V2X transmission operation and the WAN transmission operation are performed on the different carriers and a PPPP of a V2X message transmitted in the V2X transmission operation is smaller than a threshold value, the UE may allocate transmission power only to the WAN transmission operation and omits allocating transmission power to the V2X transmission operation.

If the V2X transmission operation and the WAN transmission operation are performed on the same carrier, the UE may always prioritize the V2X transmission operation.

If the V2X transmission operation and the WAN transmission operation are performed on the same carrier and a PPPP of a V2X message transmitted in the V2X transmission operation is greater than a threshold value, the UE may prioritize the V2X transmission operation.

If the V2X transmission operation and the WAN transmission operation are performed on the same carrier and a PPPP of a V2X message transmitted in the V2X transmission operation is smaller than a threshold value, the UE may prioritize the WAN transmission operation.

In another aspect, a User Equipment (UE) is provided. The UE may comprise a Radio Frequency (RF) unit configured to transmit and receive a radio signal and a processor configured to operate in conjunction with the RF unit, wherein, if a Vehicle-to-X (V2X) transmission operation and a wide area network (WAN) transmission operation overlap in a time domain, the processor determines whether or not the V2X transmission operation and the WAN transmission operation are performed on a same carrier; and wherein, if the V2X transmission operation and the WAN transmission operation are performed on different carriers, the V2X transmission operation is performed on the basis of transmission power applied to the V2X transmission operation or, if the V2X transmission operation and the WAN transmission operation are performed on the same carrier, the V2X transmission operation is performed on the basis of a priority applied to the V2X transmission operation.

According to the present invention, a P-UE which is sensitive to battery consumption performs partial sensing to select a V2X transmission resource, thereby enabled to reduce battery consumption. In addition, If V2X transmission resources are selected multiple times, resources as the same as previously selected resources are excluded from the selection, and therefore, it is possible to alleviate a half-duplex problem.

DESCRIPTION OF EXEMPLARY EMBODIMENTS

Figure 1:
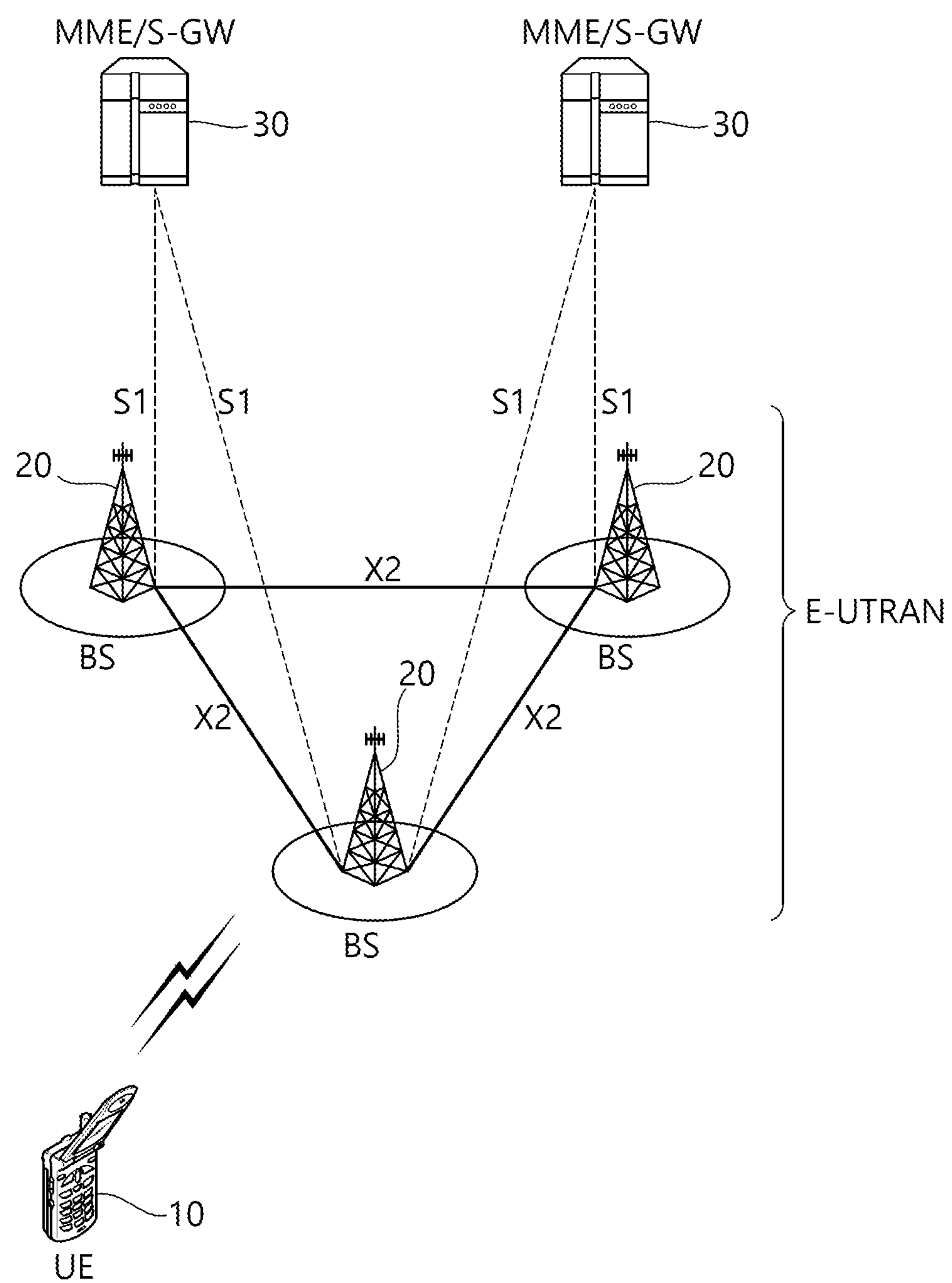
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
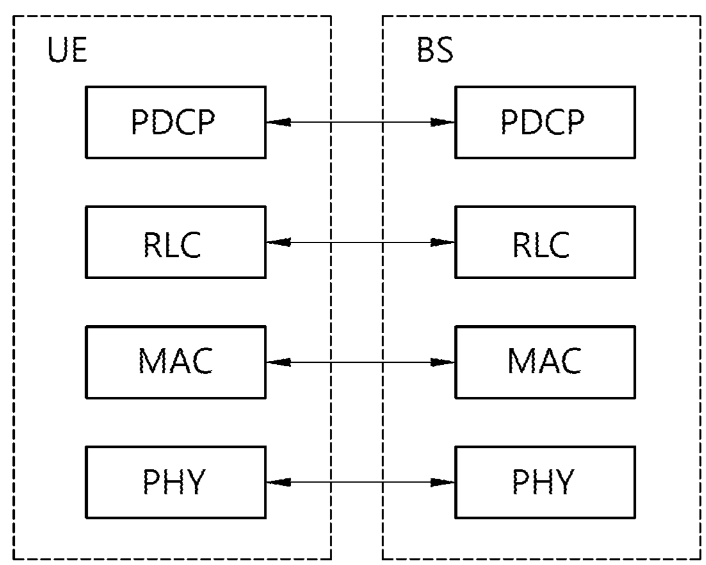
FIG. 2 is a diagram showing a wireless protocol architecture for a user plane.
Figure 3:
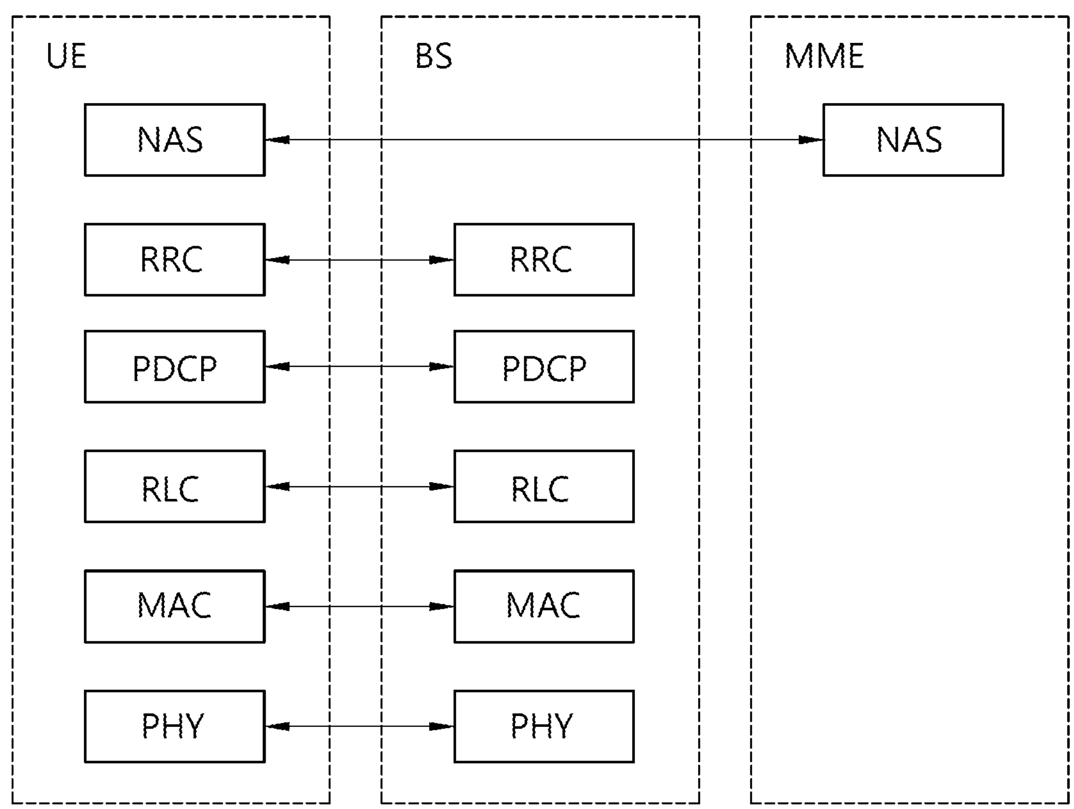
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 4:
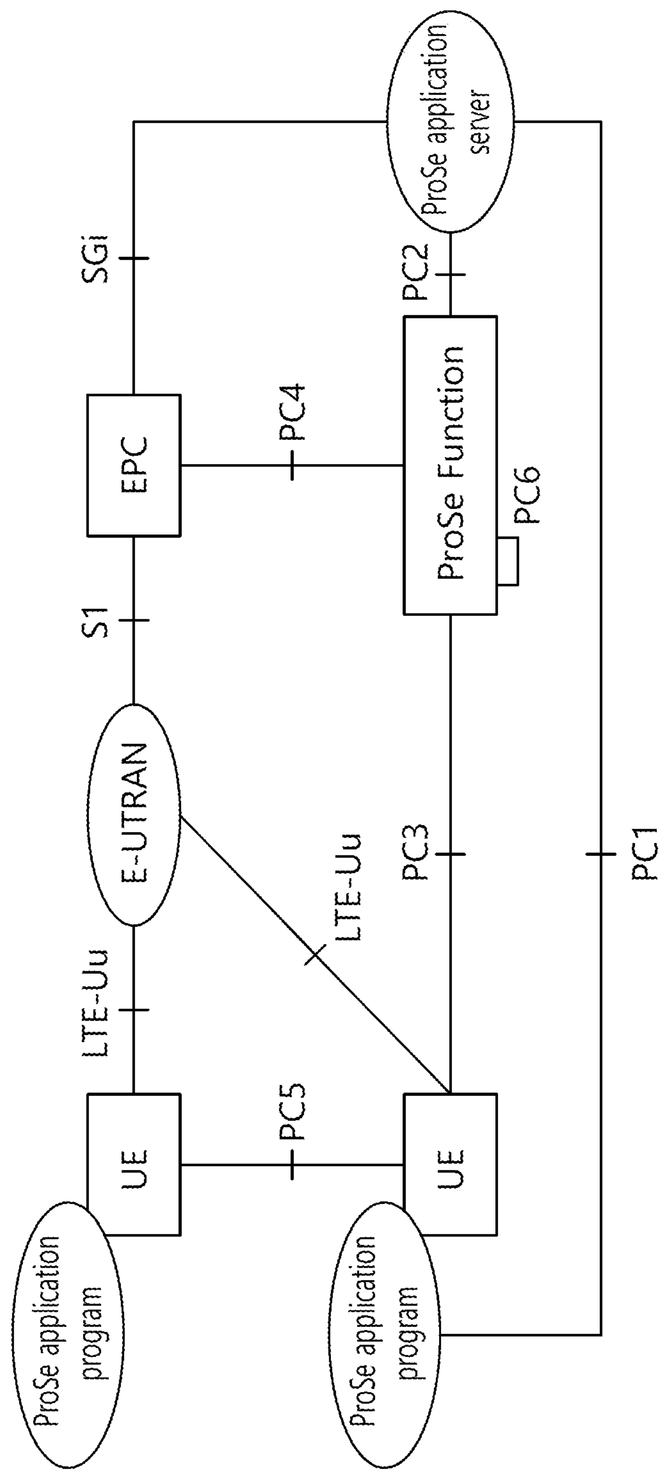
FIG. 4 illustrates a reference structure for a ProSe.

FIG. 4 illustrates a reference structure for a ProSe.

Referring to FIG. 4, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

- Interworking via a reference point towards the 3rd party applications
- Authorization and configuration of the UE for discovery and direct communication)
- Enable the function of the EPC level ProSe discovery
- ProSe related new subscriber data and handling of data storage, and also handling of ProSe identities
- Security related function
- Provide control towards the EPC for policy related function
- Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 5:
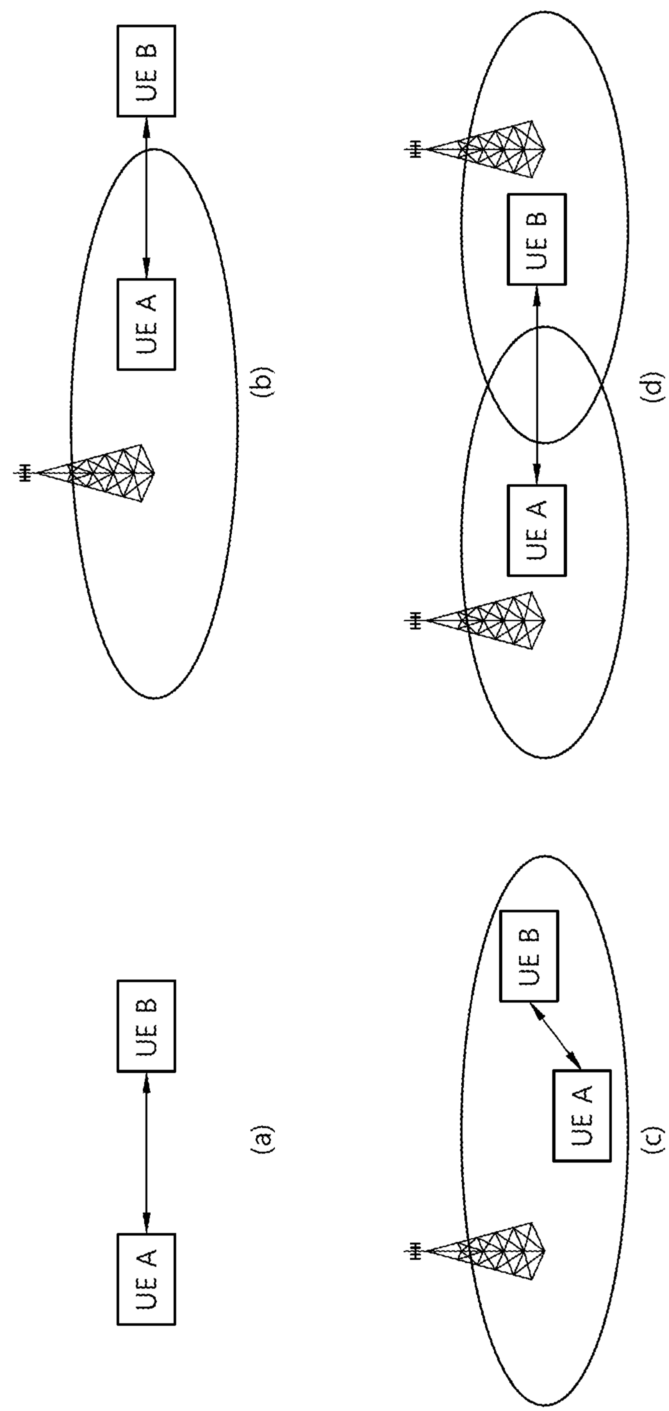
FIG. 5 illustrates arrangement examples of terminals performing ProSe direct communication and cell coverage.

FIG. 5 illustrates arrangement examples of terminals performing ProSe direct communication and cell coverage.

Referring to FIG. 5(*a*), UEs A and B may be located outside of the cell coverage. Referring to FIG. 5(*b*), the UE A may be located in the cell coverage and the UE B may be located outside of the cell coverage. Referring to FIG. 5(*c*), both of UEs A and B may be located in the cell coverage. Referring to FIG. 5(*d*), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 6:
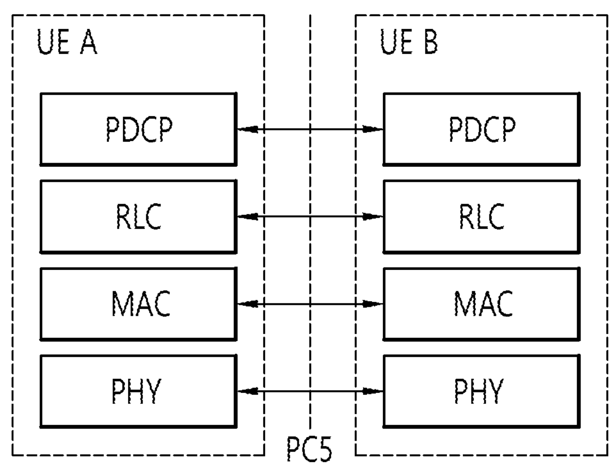
FIG. 6 illustrates a user plane protocol stack for the ProSe direct communication.

FIG. 6 illustrates a user plane protocol stack for the ProSe direct communication.

Referring to FIG. 6, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 7:
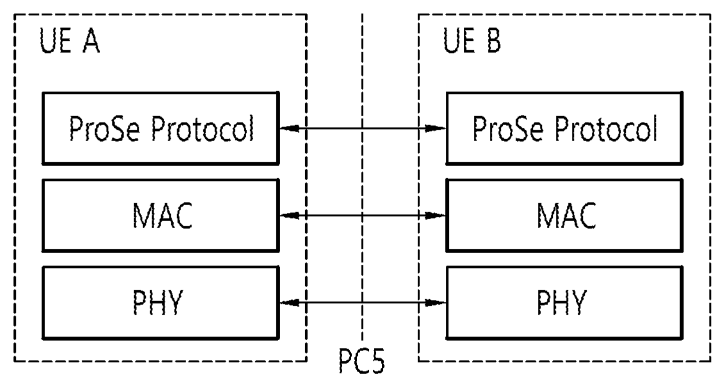
FIG. 7 illustrates a PC 5 interface for D2D discovery.

FIG. 7 illustrates a PC 5 interface for D2D discovery.

Referring to FIG. 7, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

As described above, a D2D operation generally has various advantages in that the D2D operation is signal transmission/reception between neighboring devices. For example, a D2D terminal has a high data rate and a low latency and is capable of data communication. In addition, the D2D operation can enable distribution of traffic concentrated on a base station, and thus, if the D2D terminal serves as a relay, the D2D operation can expand the coverage of the base station. An expanded version of the above-described D2D communication includes including signal transmission/reception between vehicles, and a communication technology relating to vehicles is called Vehicle-To-X (V2X) communication.

Herein, for example, the term "X" in V2X means pedestrian (communication between a vehicle and a device carried by an individual (for example) handheld terminal carried by a pedestrian, cyclist, driver or passenger)) (V2P), vehicle (communication between vehicles) (V2V), infrastructure/network (communication between a vehicle and a roadside unit (RSU)/network (for example) RSU is a transportation infrastructure entity (for example) an entity transmitting speed notifications) implemented in an eNB or a stationary UE)) (V2I/N). In addition, for example, for convenience of explanation of a proposed method, a (V2P communication-related) device carried by a pedestrian (or human) will be referred to as "P-UE", and a (V2X communication-related) device installed at a vehicle will be referred to as "V-UE". In addition, for example, the term "entity" in the present invention may be understood as a P-UE and/or a V-UE and/or RSU(network/infrastructure).

A UE providing (or supporting) the above-described D2D operation may be referred to a D2D UE, and a UE providing (or supporting) the above-described V2X operation may be referred to as a V2X UE. Hereinafter, for convenience of explanation, embodiments of the present invention will be described mainly from the perspective of the V2X UE, but description about the V2X UE may apply even to the D2D UE.

The V2X UE may transmit a message (or channel) on a predefined (or signaled) resource pool. Herein, the resource pool may indicate a resource(s) which is pre-defined for a UE to perform a V2X operation (or to be capable of performing a V2X operation). The resource poll may be, for example, defined in terms of a time/frequency.

<Method for Allowing “V2X Communication” and “Another Communication” to Coexist>

The following methods for coexistence are proposed methods for allowing “V2X communication” and “another communication (e.g., DSRC/IEEE 802.11P service”, “(different numerology-based) NEW RAT (NR) eV2X service”) to efficiently coexist in the same channel (or band) which is predefined(/signaled).

Herein, for example, when the following rules(methods) are applied, it is possible to effectively achieve “fairness” in “channel (or band) usage (or occupancy)” between different communications”

For example, the term “channel (band/resource)” used in the present invention may be understood as “carrier (frequency/pool)”.

[Coexistence method #1] A V2X UE(s) participating in “V2X communication” may omit an operation of transmitting a (V2X communication-related) channel/signal on a pre-defined (or signaled) specific (time/frequency) resource (herein, the omission can be understood as a kind of “silencing period”), and to perform an “(energy) measurement” operation.

Herein, for example, (corresponding) “silencing period” related (set) parameters (e.g., a period, a (time/frequency) resource location (length), and a hopping pattern) may be designated in the form of “carrier(pool) specific (pre)configuration”.

Herein, for example, using the corresponding “(energy) measurement” operation, it is possible to determine whether “another communication (e.g., “DSRC/IEEE 802.11P”, “(different numerology-based) NR eV2X service”)” is being implemented in a close distance (and/or the same channel (band)).

Herein, for example, a rule may be defined such that, if an “(energy) measurement” value is higher than a predefined (signaled) threshold value, it may be: (A) a V2X UE(s) stops “V2X communication” (for a pre-defined(signaled) time); or (B) a V2X UE(s) performs “V2X communication” (for a pre-defined(signaled) time) on a (corresponding changed) different resource (or channel/band) which performs “V2X” communication according to the predefined(signaled) rule (priority order).

Herein, for example, if the “(energy) measurement” value is lower than the pre-defined(signaled) threshold value, the V2X UE(s) may keep performing the “V2X communication” on the corresponding channel (band) without stopping.

Herein, for example, a (pre-defined (signaled)) (time/frequency) resource (e.g., “silencing period”) used to detect the “another communication” (and/or “other RAT”) may not apply a V2X resource pool setting-related (pre-set(signaled) length) bitmap.

Herein, for example, if the corresponding rule is applied, the (pre-defined (or signaled)) (time/frequency) resource used to detect “another communication” “(and/or “other RAT”) may be understood as being excluded from setting a V2X resource pool.

For example, a rule may be defined such that a V2X UE(s) informs its neighboring “V2X UE(s)” (and/or a “(serving) base station (RSU)”) of information on detection (or non-detection) of “another communication”.

Herein, for example, when a UE reports the corresponding information, the UE’s location information (and/or information on a resource pool (or carrier/channel/band) (index) in which “another communication” is detected (when location based resource pool (TDM (oOr FDM)) separation is set (or signaled).

Herein, for example, when receiving the information, a (serving) base station (or RSU) may inform a V2X UE(s) (on a (reported) neighboring (or identical) location (or region)) of the corresponding information (e.g., informing a “P-UE(s)” of the corresponding information (through a pre-defined signal (e.g., (WAN) DL (or PDSCH)).

Herein, for example, after receiving the corresponding information (from a V-UE(s)), a (serving) base station (or RSU) may instruct to switch to a different carrier (or channel/band/pool) on a (neighboring or identical) location (or region) at which “another communication” is detected (and/or a V2X UE(s) on a pool (or carrier/channel/band) (e.g., by controlling a P-UE(s)” to perform “activation/deactivation” of a (related) resource pool, and/or by stopping “V2X communication” (and/or V2X message TX operation”), and or according to a pre-set (or signaled) rule (or a priority)).

Herein, in another example, after receiving corresponding information (from a serving base station (or RSU)), a V2X UE(s) (e.g., “P-UE(s)”) may consider (compare) its (current) location (and/or a pool (or carrier/channel/band) on which the “P-UE(s)” performs (current) V2X message TX operation) so as to decide (or determine) whether to maintain (or stop) the V2X message TX operation and/or whether to implement “V2X communication” (and/or “V2X message TX operation”) on (the changed) different resource (or channel/band) (for a pre-set (or signaled) predetermined period of time) according to a pre-defined (or signaled) rule (or a priority).

Herein, for example, a rule may be defined to perform reporting (or signaling) corresponding information (by a “V2X UE(s)”) only when a “(energy) measurement” value is higher than a pre-defined (or signaled) threshold value.

Herein, for example, after receiving (or being reported of) information on detection of “another communication” from a V2X UE(s), a “(serving) base station (or RSU)” may instruct (1) to change a “carrier (or channel/band) on which “V2X communication” is being implemented (according to a pre-defined (or signaled) rule (or a priority)) and/or to (B) change to “UU based V2X communication”.

Herein, for example, when receiving information on detection of “another communication” from a (neighboring) adjacent V2X UE(s), a V2X UE(s) (also) changes a “channel (or band/carrier), on which “V2X communication” is being implemented, according to a pre-defined (or signaled) rule (or priority), and/or stops “V2X communication” on the corresponding channel (or band/carrier) (for a pre-defined (signaled) period of time) (and/or performs “V2X communication” “on a channel (or band/carrier/resource) changed according to a pre-defined (or signaled) rule (or priority) (for a pre-set (or signaled) period of time).

For example, to efficiently receive the information (on detection of “another communication”) (re)transmitted (or relayed) by a (serving) base station (or RSU) (and/or a (different) V2X UE(s)), a V2X UE(s) (e.g., a P-UE(s)) may be controlled to “wake up” according to a pre-defined (or signaled) period (or pattern) (regardless of “RRC_idle state”) and/or make an “attempt to receive a channel (or signal) used for that purpose”).

Herein, for example, a V2X UE(s) (e.g., a P-UE(s)) may receive (after “wake-up” operation) only “the (most) recent information-reflected (or included) (corresponding) channel (or signal) used for that purpose” transmitted at a point in time (period) prior to a resource which is selected (or reserved) for the purpose of V2X message TX (or its transmission operation (time)) (or prior to a (time (or timing)) offset value which is pre-set (or signaled) by a resource selected (or reserved) by the V2X UE(s) for the purpose of V2X MESSAGE TX (or which is pre-set (or signaled) at its transmission operation (time)), and then the V2X UE(s) may be controlled to decide (or determine) whether to perform (final) "V2X communication" (and/or "V2X MESSAGE TX operation" on the basis of the corresponding (recent) information.

For example, a rule may be defined such that, if ("V2X communication"-related) (pre-set (or signaled)) "LTE signal (or channel)" is not detected on a pre-defined (or signaled) specific (time/frequency) resource) and (at the same time) an "(energy) measurement" value is higher than a pre-defined (or signaled) threshold value, a V2X UE(s) determines that "another communication (e.g., 'DSRC/IEEE 802.11P service", "(different numerology-based) NR eV2X service") is being implemented in a close distance (and/or the same channel (or band)).

For example, when receiving information on detection (or non-detection) of "another communication" from a specific V2X UE(s), a (serving) base station (or RSU) (and/or a (different) V2X UE(s)) may inform neighboring (other) V2X UE(s) (which has established connection within coverage) (e.g., "P-UE(s)") (and/or the base station (or RSU)) of the corresponding information through a pre-defined channel (or signal).

Herein, for example, such information may be transmitted along with additional information such as pre-defined (or reported) "information on a location (or identifier) of a "specific V2X UE(s)" (and/or (when location-based resource pool (TDM (or FDM)) separation operation is set (or signaled)) information on (an index of) a resource pool (or carrier/channel/band), on which "another communication" detected, and/or "(energy) measurement information").

For example, according to the rule, in the case of a V2X UE(s) which has stopped "V2X communication" on an existing channel (or band) (for a pre-defined (or signaled) period of time) (and/or which has implemented "V2X communication" on a different resource (or channel/band)), the V2X UE(s) may perform "(energy) measurement" operation again on a specific (time/frequency) resource, and, if "another communication" is not detected", the V2X UE(s) may implement "V2X communication" again (on the existing channel (or band)).

In an additional example, a rule may be defined such that "V2X communication" is implemented on an existing channel (or band) again (A) only when "another communication" is not detected (after "(energy) measurement" operation) and/or (B) only when a pre-defined (or signaled) back-off (or counter) value ("X") is equal to or smaller than "0" (or a random (failure) value selected (chosen) within a range of "0≤X≤1" is equal to or smaller than a pre-defined (or signaled) probability value).

Herein, for example, whenever "another communication" is not detected (in response to "(energy) measurement" operation), the back-off value may be reduced by a pre-defined (or signaled) value (e.g., "1").

For example, an "(energy) measurement" operation for detecting another communication (e.g., "'DSRC/IEEE 802.11P service, "(different numerology-based) NR eV2X service") needs to be implemented at the same time by V2X UE(s) (located at least in a pre-defined (or signaled) distance).

Otherwise, for example, "V2X communication" (being implemented in a close distance (and/or on the same channel (or band)) may be misunderstood as "another communication", and thus, "V2X communication" may be stopped excessively.

Accordingly, for example, a rule may be defined such that information relating to a (time/frequency) resource, on which "(energy) measurement" operation is being implemented, (e.g., a period, a subframe offset, a (hopping) pattern, etc.) is set (or signaled) and applied with reference to "(instead of "local time") Global Positioning System (GPS) time (or Coordinated Universal Time (UTC))" (or time (synchronization) of a "(serving) base station (or RSU)").

Herein, for example, the information relating to a (time/frequency) resource on which "(energy) measurement" operation is being implemented may be set (differently or independently) in consideration of "V2X message type (e.g., "periodic" or event-triggered" V2X message) and/or "V2X message priority" and/or "V2X UE density (or speed)" and/or "V2X message priority" and/or "V2X UE type".

For example, the "(energy) measurement" operation may be performed (directly) by a (serving) base station (or RSU), (not just by a V2X UE(s)).

Herein, for example, when detecting "another communication (e.g., "DSRC/IEEE 802.11P service", "(different numerology-based) NR eV2X service)" in a close distance (and/or the same channel (or band)), a (serving) base station (or RSU) may inform (or instruct) a neighboring V2X UE(s) (which exists within coverage or which has established connection) of whether "V2X communication" (on the corresponding channel (or band)) is stopped (and/or whether "V2X communication" is being implemented on a different resource (or channel/band) according to a pre-defined (or signaled) rule (or priority)) (through a pre-defined channel (or signal)).

In another example, when "cross carrier (or pool) scheduling is performed for various purposes/reasons (e.g., congestion control) (e.g., when SA transmission and data transmission are performed on different carriers (or pools), and when a (rear) part of data (or SA) repetition transmission is performed in a different carrier (or pool)), different PHY formats may be used in the different carriers (or pools) according to a pre-defined (or signaled) rule (or information).

Herein, for example, which PHY format (e.g., "RS structure") used by a V2X UE to transmit (control/data information) on a specific carrier may be informed (to other V2X UE(s)) through a (new) field on a pre-defined (or signaled) channel (e.g., a PSCCH).

Herein, for example, a PHY format of a channel (e.g., a PSCCH) used to transmit "scheduling/control information (and/or information on a used PHY format)" may be identically (or commonly) defined for different carriers (or pools).

In another example, a V2X UE(s) may be controlled to perform (transmission) resource (re)selection, as below. Hereinafter, an example of 1. (Transmission) resource (re) selection operation will be described with reference to Table 1, and an example of 2. Transmission resource (re)reservation (or selection) operation by a V2X TX UE(s) will be described with reference to Table 2.

TABLE 1

| |
|---|
| 1. Description about an example of (transmission) resource (re)selection |
| A V2X UE may select a transmission resource in the following method. |
| A UE is assumed to be in a mode for selecting a resource by itself. In the mode, when |

TABLE 1-continued section/reselection of a resource for transmitting a V2X message is triggered, the UE performs sensing and select/reselect the resource on the basis of the sensing. The UE may transmit scheduling assignment (SA) indicating the selected/reselected resource.
For example, the UE may be triggered to select/reselect a resource from subframe (or TTI) #n. Then, the UE performs sensing between subframe#n − 1 and subframe #n − b (a > b > 0, and a, b are natural numbers), and selects/reselects a resource for transmitting a V2X message on the basis of a result of the sensing.
The a, b may be values set commonly for V2X UEs, or may be values set independently for each V2X UE.
Alternatively, when the a, b are values set commonly for V2X UEs, they may be, for example, in a relationship of "a = 1000 + b". That is, when the UE is triggered to select by itself a resource for transmitting a V2X message, the UE may perform sensing operation in one second (1000 ms = 1000 subframes = 1000 TTI).
The UE may consider all SA transmission decoded from the subframe #n − a to the subframe #n − b. The decoded SA may relate to data transmission in a section from the subframe #n − a to the subfrmae #n − b, and the decoded SA may consider even data transmitted prior to the subframe #n − a.
The UE not having performed on sensing on subframe #m (e.g., for the reason of a need of transmitting a signal on the subframe #m) may exclude subframes #(m + 100*k) from resource selection/reselection. Meanwhile, the UE does not perform sensing operation on subframes used by itself to transmit a signal, and skips sensing.
After the sensing, the UE selects a time/frequency resource for a PSSCH, that is, a sidelink data channel.
The UE may transmit scheduling assignment (SA) on subframe #n + c. C is an integer equal to or greater tha 0, and it may be a fixed value or a variable. The UE may not be required to perform SA transmission (that is, PSCCH transmission) to subframes whose value of C is smaller than $C_{min}$. $C_{min}$ may be a fixed value or a value set by a network.
The SA transmitted on the subframe #n + c may indicate associated data transmitted from subframe #n + d. d may be an integer equal to or greater than c. Both of c and d may be values equal to or smaller than 100.
d may be a value equal to or smaller than $d_{max}$. $d_{max}$ may be determined dependent upon a priority of UE/data/service type.
The UE may inform whether or not to reuse a signal transmitted on the subframe #n + d for potential transmission of another Transport Block (TB) on subframe #n + e. Herein, e is an integer and in a relationship of d < e. The UE may explicitly or implicitly inform whether to reuse the above signal. e may be a single value or multiple values. In addition, the UE may inform that a frequency resource for transmitting a signal on the subframe #n + d will be not used after the subframe #n + e.
A receiver UE receiving a V2X signal decodes scheduling assignment (SA) transmitted by a transceiver UE transmitting the V2X signal. At this point, it may be assumed that the same frequency resource is reserved in subframe #n + d + P*j (j = i 2*i, . . . , J*i) by the SA. P may be 100. The value of J may be implicitly signaled by the SA or may be a fixed value (e.g., 1). The value of i may be explicitly signaled by the SA, or may be a preset value or a fixed value. Alternatively, the value of i may be an integer between 0 and 10.
Meanwhile, if any one of the following conditions is satisfied, reselection of a V2X resource may be triggered.
1. When a counter satisfies an expiration condition,
The value of the counter may increase at each TB transmission, and, when reselection of all of semi-statically selected resources is triggered, the value of the counter may be reset. The value to be reset may be randomly selected between 5 and 15 at an equal probability.
2. When a TB is not suitable for the current resource allocation despite use of the maximum Modulation and Coding Scheme (MCS),
3. When resource reselection is indicated by an upper layer.
Meanwhile, when all PSCCH/PSSCH transmissions have the same priority, selection/reselection of a PSSCH may be performed through the following procedure.
First of all, all resources is considered selectable, and specific resources are excluded based on SA decoding and additional conditions. At this point, the UE may select one of the following two options.
The first option is excluding resources whose DM-RS power received from resources indicated or reserved by decoded SA and from data resources related to the SA is equal to or greater than a threshold value.
The second option is excluding resources whose energy measured in resources indicated or reserved by decoded SA and in data resources related to the SA is equal to or greater than a threshold value.
The UE may select a V2X transmission resource from non-excluded resources.
For example, the UE may measure and rank remaining PSCCH resources based on the total received energy, and select sub sets. The UE may compare energy in the currently selected resources and energy in the sub sets, and, if the energy of the selected resources is greater than the energy of the sub sets, the UE may select one of the sub sets. The UE may randomly select one resource from the selected sub set.
2. When a TB is not suitable for the current resource allocation despite use of the maximum Modulation and Coding Scheme (MCS),
3. When resource reselection is indicated by an upper layer.
Meanwhile, when all PSCCH/PSSCH transmissions have the same priority, selection/reselection of a PSSCH may be performed through the following procedure.
First of all, all resources is considered selectable, and specific resources are excluded based on SA decoding and additional conditions. At this point, the UE may select one of the following two options.

TABLE 1-continued

| |
|---|
| The first option is excluding resources whose DM-RS power received from resources indicated or reserved by decoded SA and from data resources related to the SA is equal to or greater than a threshold value.<br>The second option is excluding resources whose energy measured in resources indicated or reserved by decoded SA and in data resources related to the SA is equal to or greater than a threshold value.<br>The UE may select a V2X transmission resource from non-excluded resources.<br>For example, the UE may measure and rank remaining PSCCH resources based on the total received energy, and select sub sets. The UE may compare energy in the currently selected resources and energy in the sub sets, and, if the energy of the selected resources is greater than the energy of the sub sets, the UE may select one of the sub sets. The UE may randomly select one resource from the selected sub set.<br>Or, the UE may measure and rank remaining PSSCH resources based on total received energy, and select sub sets. The UE may randomly select one resource from the sub sets.<br>Or, the UE may measure and rank remaining PSSCH resources based on total reception energy, and select sub sets. The UE may select a resource, which minimizes fragmentation of frequency resources, from the sub sets.<br>Or, the UE may measure received power of a PSSCH resource indicated by decoded SA, add it up as total received power of subframes, and sort out the subframes according to the total reception power. The UE randomly select a transmission subframe from a set of available subframes. Then, the UE may randomly select a frequency from a transmission subframe.<br>In the above-described procedure, the UE excludes a specific resource based on SA and additional conditions, and selects a V2X transmission resource. At this point, when SA and data associated with the SA are transmitted on the same subframe, a method of excluding a resource based on DM-RS received power of a PSSCH may be supported. That is, it is excluding resources whose PSSCH reference signal received power (RSRP) received from resources indicated or reserved by decoded SA and from data resources associated with the SA is equal to or greater than a threshold value. Specifically, the PSSCH RSRP is may be defined as a linear average of power distribution of resource elements (REs) which carry DM-RSs associated with the PSSCH in physical resource blocks (PRBs) indicated by a PSCCH. The PSSCH RSRP may be measured with reference to an antenna connector of the UE. The SA may include a 3-bits PPPP field. The threshold value may be given in the form of a function regarding priority information. For example, the threshold value may be dependent on priority information of TBs and priority information of decoded SA. The threshold value may be given on a unit basis of [2 dBm] in a range between [−127 dBm] and [0 dBm]. 64 threshold values in total may be preset.<br>The UE may decode SA on subframe #m −+ c in a sensing section, and assume that the same frequency resource is reserved on subframe #m + d + P*i by the SA. AS described above, P may be a fixed value of 100. i may be selected from a range of [0, 1, . . . , 10], and may be subcarrier-specifically set by a network or may be preset. i = o indicates no intention of reserving a frequency resource. i may be set by a 10-bit bitmap or may be set by a 4-bit field in SA.<br>When a semi-static resource candidate X collides with resource Y, which is reserved due to SA of a different UE, in period P*I, and when an exclusion condition is satisfied, the UE may exclude the resource candidate X. I is a value of i which is signaled by SA.<br>When resources remaining after resource exclusion through SA decoding and sensing operation is smaller than 20% of all resources in a selection window, the UE may increase a threshold value (e.g., 3 dB) and exclude a resource again, and this procedure may be performed until resources remain more than 20% of total resources in the selection window. The total resources in the selection window indicate available resource candidates that the UE needs to consider.<br>Meanwhile, in the procedure of selecting a V2X transmission resource after excluding a specific resource, when the counter reaches 0, the UE may maintain the current resource at a probability of p and reset the counter. That is, a resource may be reselected at a probability of 1 − p.<br>A subcarrier-specific parameter p may be preset and may be set in a range of [0, 0.2, 0.4, 0.6, and 0.8].<br>The UE measures remaining PSSCH resources except for a specific resource, ranks the remaining PSSCH resources on the basis of total received energy, and select a sub set. The sub set may be a set of resource candidates having the lowest received energy. The size of the sub set may be 20$ % of total resources in a selection window.<br>The UE may randomly select one resource from the sub set.<br>When a single TB is transmitted on a single subframe, the UE may select M number of consecutive sub-channels, and an average of energy measured in each sub-channel may be an energy measurement value of each resource. |

TABLE 2

| |
|---|
| 2. Description about an example of an operation of (re)reserving (or selecting) a transmission resource by a V2X TX UE(s)<br>2-1. UE procedure for determining subframes and resource blocks for transmitting PSSCH and reserving resources for sidelink transmission mode 4<br>The number of sub frames in one set of time and frequency resources for transmission of PSSCH is given as $C_{resel.}$ In this case, if $C_{resel}$ is set, it may be given as [10*SL_RESOURCE_RESELECTION_COUNTER], and otherwise $C_{resel}$ may be set to 1. |

TABLE 2-continued

| |
|---|
| When the same set of sub-channels in a subframe $t_{m+P_{rsvp}*j}^{SL}$ may be determined regarding PSCCH transmissions corresponding to the same slidelink grant. Herein, J = 1, 2, . . . and, with respect to $C_{resel}$-1, $P_{rsvp,}$ a resource reservation interval may be determined by upper layers. |
| 2.2. UE procedure for transmitting the PSCCH |
| Regarding the sidelink transmission mode 4, a UE may set SCI format 1 as below. |
| If SL_RESOURCE-RESELECTION_COUNTER is greater than 1, the UE may set a resource reservation field as a resource reservation section determined by upper layers separated by $P_{step.}$ Herein, $P_{step}$ may be 100. If not, the UE set a resource reservation |
| resource selection in sidelink transmission mode 4 |
| In response to a request from upper layers on subframe n, a UE may determine a set of resources to be excluded from PSSCH transmission according to the following steps. The upper layers may determine a parameter $L_{subCH}$ corresponding to the number of sub-channels used for PSSCH transmission on a subfrrame, a parameter $P_{rsvp\_TX}$ corresponding to a resource reservation interval determined by an upper layer, and a parameter $prio_{TX}$ corresponding to a priority transmitted by a UE in SCI format 1. |
| STEP 1) A single subframe resource candidate Rx, y relating to PSSCH transmission may be determined as the same as a set of sub-channels adjacent to a sub-channel x + j on a subframe $t_y^{SL}$. Herein J = 0, . . . $L_{subC-}$ − 1. |
| STEP 2) The UE monitors subframes n-1001-, n-1000, n-999, . . . , n-2 which are excluded from the UE's transmission change. |
| STEP 3) A parameter $Th_{a,\ b}$ may be set as the same as a value that starts by the i-th SL-ThreasPSSCH-RSRP field in SL-ThresPSSCH-RSRP-List-r14. In this case, i = a*8 + b + 1. |
| STEP 4) A set $S_A$ may be reset to a combination of all single frame resource candidates. A set $S_B$ may be reset to an empty set. |
| STEP 5) When the following condition is satisfied, the UE excludes a subframe subframe resource candidate $R_{x,\ y}$ from the set $S_A$. |
| The UE may receive SCI format 1 from a subframe $t_y^{SL}$. In addition, a "resource reservation" field and a "priority" filed in the received SCI format 1 may respectively indicate $P_{rsvp\_RX}$ and $prio_{RX.}$ |
| PSSCH-RSRP measurement according to the received SCI format 1 may be greater than $Th_{prio_{TX},prio_{RX}}$. |
| The same SCI format 1 estimated to be received from the subframe $Th_{m+prio_{step}*prio_{rsvp\_RX}}$ may be determined depending on resource blocks and a set of subframes overlapping with $R_{x,\ y+P_{rsvp\_TX}*J}$ regarding j = 0, 1, . . . , $_{Cresel}$-1 |
| STEP 6) If the number of single subframe resource candidates remaining in the set SA is smaller than 0.2 · $M_{total,}$ STEP 4 may be repeated as the same as $Th_{a,b}$ which has increased by 3 dB. |
| STEP 7) Regarding a single subframe resource candidate $R_{x,\ y}$ remaining in the set $S_A$, a matrix $E_{x,\ y}$ may be defined as the same as a linear average of S-RSSI measured in a sub-channel x + k regarding subframes k = 0, . . . $L_{subCH}$-1 monitored in STEP 2. |
| STEP 8) The UE may transfer the single subframe resource candidate $R_{x,\ y}$ along with the minimum matrix $E_{x,\ y}$ from the set $S_A$ to a set $S_B$. This step may be performed repeatedly. |
| STEP 9) A set $S_C$ may be defined as a set of all single subframe resource candidates not included in the set $S_{B.}$ |

For example, the following coexistence methods proposes methods in which a V2X UE(s) effectively performs V2X communication-related "sensing operation" and/or "resource (re) selection operation" when detecting another communication (e.g., "DRSC/IEEE 802.11P service", "(different numerology-based) NR eV2X service") on a specific channel (or band/carrier) according to (the above-described) rule and performing "channel (or band/carrier) switching (or changing) operation".

Herein, for example, the term "sensing" may be understood as an energy measurement operation on a pre-defined (or signaled) reference signal (RS) and/or a channel (e.g., DM-RS RSRP of PSSCH (associated with a decoded PSCCH) and/or S-RSSI), or as a decoding operation on a pre-defined (or signaled) channel (e.g., PSCCH).

Herein, for example, such (some) coexistence methods may be applicable even to the case where a V2X UE(S) performs a "channel (or band/carrier) switching (or changing) operation" according to a pre-defined rule (or according to a received signaling (or indication) (from a (serving) base station (or RSU)) since a "congestion level" of a specific channel (or band/carrier), on which V2X communication is being implemented, has increased (to be higher than a pre-set (or signaling) threshold value).

[Coexistence Method #2] When performing a "channel (or band/carrier) switching (or changing) operation", a V2X UE(s) is allowed to randomly (re)select resources (from a "V2X resource pool" on a switched (changed) channel (or band/carrier)) to be used for V2X communication.

Herein, for example, the "channel (or band/carrier) switching (or changing) operation" may be understood to be a condition for triggering (or performing "(transmission) resource (re)selection".

Herein, for example, the resources randomly (re)selected according to the rule may be allowed (to be used only to transmit "Transport Block (TB)" a pre-set (or signaled) number of times (e.g., "1") after the channel (or band/carrier) switching (or changing) operation") not for "reservation" (or "Semi-Persistent Scheduling (SPS)").

Herein, for example, when the "channel (or band/carrier) switching (or changing) operation" is implemented, the randomly (re)selected resources may be (exceptionally) allowed for "reservation" (or "SPS") (for the purpose of multiple (or pre-set (or signaled) number of times of) "TB" transmission) or may be allowed to be used (or reserved) as a (frequency) resource used for (multiple (or pre-set (or signaled) number of times of) "TB" transmission in the future.

In another example, a V2X UE(s) may be allowed to (first) perform a "sensing" operation on a switched (or changed) channel (or band/carrier) in a pre-set (or signaled) period of time, and then, based on the result, (re)select (optimal) resources used for V2X communication.

Herein, for example, the "sensing time section" value (and/or the "PSSCH-RSRP measurement" threshold value on STEP 5 of Section 2.3. of Table 2 (which may be understood as a "0.2*Mtotal"-related coefficient (or proportion) value on STEP 6 (or 8) of Section 2.3. of Table 2 (e.g., a proportion value for deriving (or determining) the minimum number of resources (candidates) (from among total resources (candidates)) to remain (in the SA set) after STEP 8 of Section 2.3. of Table 2 and/or as a proportion value for deriving (or determining the (minimum) number of resources (candidates) to remain in the SB set after STEP 8 of Section 2.3. of Table 2), and/or a "PSSCH-RSRP measurement" increased value (e.g., "3DB") applicable when the minimum number of resources (candidates) (from total resources (candidates)) to remain in the SA set after STEP 5 of Section 2.3. of Table 2 is not satisfied, and/or a period value used for energy measurement operation (e.g., STEP 8 in Section 2.3. of Table 2)) may be set (or signaled) to be different from (e.g., having a relatively smaller (or greater) value than) (or the same as) a value (e.g., "1000MS") applied (or used) when "channel (or band/carrier) switching (or changing) operation" is not performed.

Herein, for example, the number of limited subframes (of a resource reservation (interval) period) assumed (or used) for transmission resource (re)reservation (or selection) (and/or a Cresel value (e.g., "[10*SL_RESOURCE_RESELECTION_COUNTER]") in Table 2 Section 2.1), and/or a 1 VALUE (range) value able to be selected (or allowed) on a V2X resource pool (and/or (V2X) carrier), and/or a P_STEP value, and/or a transmission power-related (OPEN-LOOP) parameter (or value) (e.g., "PO", "ALPHA", etc.) may be set (or signaled) differently compared to those values applied (or used) when the channel (or band/carrier) switching (changing) operation" is not performed.

[Coexistence Method #3] When performing a "channel (or band/carrier) switching (or changing) operation", a V2X UE(s) may (re)select resources (from a "V2X resource pool" on a switched (or changed) channel (or band/carrier)) to be used for V2X communication according to the following (some) rules.

(Example #3-1) Despite a "channel (or band/carrier) switching (or changing)" operation, if there is no (to-be-transmitted or generated) packet (or message) on a "(low layer) buffer" (and/or "PDCP LAYER"), a V2X UE(s) may (partially) perform a "sensing" operation (on "V2X resource pool" on a switched (or changed) channel (or band/carrier)).

Herein, for example, a "(partial) sensing" operation may be performed until a (to-be-transmitted or generated) packet (or message) exists (or reaches) a "(low layer) buffer" (or until a packet (or message) is generated) (or only in a pre-set (or signaled) period of time).

Herein, for example, when such a rule is applied, a V2X UE(s) may lastly (re)select the most suitable (transmission) resource (from a "V2X resource pool" on a switched (or changed) channel (or band/carrier)) based on a result of the "(partial) sensing" operation.

Herein, for example, a V2X UE(s) may (re)select its own (transmission) resource (limitedly) only in a resource (region) where a "(partial) sensing" operation is performed.

Herein, for example, it may be defined such that a "TB" transmission-related (frequency) resource is allowed for "reservation (or "SPS") only when a "(partial) sensing" operation is performed.

In another example, if "latency" remains a lot (more than a pre-set (or signaled) threshold value) despite "channel (or band/carrier) switching (or changing)", a V2X UE(s) may (partially) perform a "sensing" operation (on a "V2X resource pool" on a switched (or changed) channel (or band/carrier)).

(Example #3-2) (In the above (Example #3-1)) Depending on whether or not a pre-set (or signaled) condition is satisfied, a V2X UE(s) may perform (or select) one of (A) resource (re)selection based on a "(partial) sensing" operation and (B) resource (re)selection based on "random".

Herein, for example, when the following (some) conditions are satisfied, the resource (re)selection based on "random" (or resource (re)selection based on a "(partial) sensing" operation) may be performed: otherwise, the resource (re)selection based on the "(partial) sensing" operation (or resource (re)selection based on "random") may be performed.

(Example #3-2-1) The case where a (newly) generated (or to-be-transmitted) packet (or message) exists on a "(lower layer) buffer" (and/or on a "PDCP layer") when "channel (or band/carrier) switching (or changing)" is performed.

(Example #3-2-2) The case where "latency" less than a set (or signaled) threshold value remains when "channel (or band/carrier) switching (or changing)" is performed.

(Example #3-2-3) The case where a resource-related "(reselection) counter" value (re)selected from a "V2X resource pool" on an existing channel (or band/carrier) when "channel (or band/carrier) switching (or changing)" is performed (and/or the case where "TB" transmission is performed (or not performed) a pre-set (or signaled) number of times (or period) using a (re)selected (frequency) resource).

(Example #3-3) When a V2X UE(s) performs "channel (or band/carrier) switching (or changing)", a location of a V2X communication-related (transmission) resource (at least) on a switched (or changed) channel (or band/carrier) may be succeeded (or maintained) identically a location thereof on an existing channel (or band/carrier) in the case where a "(reselection) counter" value relating to a resource (re)selected from a "V2X resource pool" on the existing channel (or band/carrier) is greater (or smaller or equal) than a pre-set (or signaled) threshold value (e.g., "0") (and/or in the case where "TB" transmission is not performed (or is performed) a pre-set (or signaled) number of times (or period) using a (re)selected (frequency) resource again, and/or in the case where, when the "channel (or band/carrier) switching (or changing)" is performed, a (newly) generated (or to-be-transmitted) packet (or message) exists (or does not exist) (on a "(low layer) buffer (and/or on a "PDCP layer")), and/or in the case where, when the "channel (or band/carrier) switching (changing)" is performed, less "latency" (or more latency) (than a pre-set (or signaled) threshold value) remains.

Herein, for example, when such a rule is applied, (some) parameters related to (transmission) resource (re)selection on an existing channel (or band/carrier) (e.g., "(reselection) counter", a number of times (or period) "TB" transmission is performed using a (re)selected (frequency) resource, etc.) may be understood to be succeeded to a switched (or changed) channel (or band/carrier).

Herein, for example, the above rule may be applied limitedly only to the case where the existing channel (or band/carrier) is identical to V2X communication-related "resource pool configuration (or bandwidth)" on the switched (or changed) channel (or band/carrier).

For example, in the case where a V2X UE(s) performs "channel (or band/carrier) switching (or changing)" and sets a location of a V2X communication-related (transmission) resource on a switched (or changed) channel (or band/carrier) (re)using a result of sensing on the existing channel (or band/carrier), the V2X UE(s) may select (or reserve) (the most) suitable resource (based on the result of sensing on the existing channel (or band/carrier)) by considering only a (V2V communication-related) resource (pool) region in which the existing channel (or band/carrier) and the switched (or changed) channel (or band/carrier) overlap (on a logic resource region).

Herein, for example, in the case where a V2X UE(s) performs "channel (or band/carrier) switching (or changing)" and sets a location of a V2X communication-related (transmission) resource on a switched (or changed) channel (or band/carrier) (re)using a result of sensing on the existing channel (or band/carrier), if the corresponding location of the (transmission) resource which has been set ((re)using the result of sensing on the existing channel (or band/carrier) is (already) occupied by a different V2X UE(s) on the switched (or changed) channel (or band/carrier) (e.g., this may be understood as the case where the V2X UE(s) has (previously) performed a sensing operation on the switching (or changed) channel (or band/carrier)), (A) only a colliding (transmission) resource may be reselected (and/or randomly selected) and/or (B) only a non-colliding (overlapping) (transmission) resource may be used for (V2X message) transmission.

For example, while a V2X UE(s) (having a receiving (or sensing) capability related to a plurality of channels (or bands/carriers)) performs a sensing (receiving) operation on the (corresponding) plurality of channels (or bands/carrier) (and/or another communication (e.g., "DSRS/IEEE 802.11P service", "(different numerology-based) NR eV2X service") detection operation), if another communication is detected on a channel (or band/carrier) on which the V2X UE(s) is currently performing a (V2X message) transmission operation, the V2X UE(s) may select one of the (corresponding) plurality of channels (or bands/carriers) on which the sensing (receiving) operation (and/or another communication detection operation) is performed (except for the corresponding channel (or band/carrier), and, may perform a channel (or band/carrier) switching (or changing) operation.

Herein, for example, the V2X UE(s) may first select (A) a channel (or band/carrier) of which a congestion level (and/or a sensed energy measurement value) is (relatively) low, and/or (B) a channel (or band/carrier) in which resources occupied by the V2X UE(s) is (relatively) less, and/or (C) a channel (or band/carrier) in which another communication is not detected, and/or (E) a channel (or band/carrier) having a (relatively) low (or high) index (and/or first select a (high (or low) (priority) level) channel (or band/carrier) according to a pre-set (or signaled) (priority) level), or may select randomly.

For example, while a V2X UE(s) uses a (pre-set (or signaled)) specific carrier (or channel/band) for (V2X message) transmission, if a pre-set (or signaled)) different carrier (or channel/band) is determined to have a relatively lower "congestion level" (and/or "load level") and accordingly the V2X UE(s) immediately (or quickly) switches to the (corresponding) different carrier (or channel/band), the system may become unstable.

Herein, for example, to alleviate the corresponding problem, (A) a timer for maintaining (V2X message) transmission on an existing carrier (or channel/band) (before ("congestion level" (and/or "load level")-based) carrier (or channel/band) switching is applied) may be set (or signaled), and/or (B) switching to a (relatively low "congestion level" (and/or "load level") different carrier (or channel/band) may be performed only when a "congestion level difference" between an existing carrier (or channel/band) and the different carrier (or channel/band) (and/or "load level difference") exceeds a pre-set (or signaled) threshold value (e.g., which can be understood as a kind of ("congestion level" (and/or "load level")-related) "hysteresis").

For example, a V2X UE(s) assumes that there are a resource (RES_L), for which "RAT" is set (or signaled) with a (relatively) low priority, and a resource (RES_H) for which "RAT" is set (or signaled) with a (relatively) high priority (see Table 3).

Herein, for example, while a V2X UE(s) performs V2X communication on "RES_H", when the V2X UE(s) considers switching (or offloading) to "RES_L" because a (measured) ("RES_H" related) "congestion level" value is greater than a pre-set (or signaled) threshold value (CL_RSC_H) (e.g., "CL_RSC_H? can be regarded a threshold value associated with "RES_H") (actual) switching (from "RES_H" to "RES_H") may be allowed only when the "RES_L" related (measured) "congestion level" value is smaller than a pre-set (or signaled) threshold value (CL_RSC_L) (e.g., "CL_RSC_L" can be regarded as a threshold value associated with "RES_L").

Herein, for example, "CL_RSC_H" and "CL_RSC_L" may be set (or signaled) to be different values (e.g., "CL_RSC_H>CL_RSC_L").

For example, a V2X UE(s) may perform a "congestion level" (and/or "load level") measurement operation (and/or "another communication" (e.g., "DSRC/IEEE 802.11P service", "(different numerology-based) NR eV2X service") (and/or "other RAT") detection operation), not in a V2X resource pool (designated in the form of "carrier(or cell)-specific network (pre)configuration"), but even in a (pre-set (or signaled) (external) resource region.

Herein, for example, if an ((external) resource region-related) "congestion level" (and/or "load level") measurement is high, it may be determined that "another communication" (and/or "other RAT") exists.

Herein, for example, the corresponding ((external) resource region-related) "congestion level" (and/or "load level") measurement (and/or "another communication" (and/or "other RAT" detection) may be implemented in a pre-set (or signaled) (additional) sub-channel (in an (external) resource region) and/or implemented in the entire bands (in an (external) resource region).

Herein, for example, a ("congestion level" (and/or "load level") measurement-related) (S-RSSI) measurement operation may be performed within a V2X resource(s) in any V2X resource pool.

Herein, for example, the corresponding ("congestion level" (and/or "load level") measurement-related) (S-RSSI) measurement operation may be performed in the form of "(V2X) pool-specific" (or "(V2X) pool-common), and a region other than the (V2X) pool may be measured additionally.

Herein, for example, the measurement operation (in the V2X resource(s)) in the above (some) rules may be performed in a (V2X) TX pool (and/or (V2X) RX pool) (on a corresponding carrier).

For example, when a V2X TX UE(s) performs switching of ("V2X communication" (and/or "V2X message TX operation") related) carrier (or channel/band/pool) (according to a pre-set (or signaled) rule (or (priority) level), the V2X TX UE(s) may (in advance) signal (or broadcast) the carrier (channel/band/pool), on which the V2X performs switching, to a (neighboring) V2X RX UE(s) through a pre-defined channel (e.g., "PSCCH (or PSSCH)" and/or "PSBCH").

Herein, for example, a (specific) carrier (or channel/band/pool) on which a channel for the purpose is transmitted may be pre-set (or signaled) (in the form of "UE-common").

For example, Table 3 shows a method by which "V2X communication" and "another communication (e.g., "DSRC/IEEE 802.11P service", "(different numerology-based) NR eV2X service") coexist efficiently.

TABLE 3

3. Example of a method for allowing "V2X communication" and "another communication" to coexist efficiently Proposal 1: LTE SL V2V design for coexistence with Dedicated Short-Range Communications (DSRC) needs to consider coexistence with NR V2X. That is, LTE SL V2V design for coexistence with NR V2X needs to be considered.

3.1. Available solutions distinguishable in phase

Proposal 2: RAN1 specification support may not be necessary for options of "geographical location and database" and "GNSS timing-based time share between systems"

3.2. Detection of a different RAT

Proposal 3: A LTE UE may detect existence of a different RAT when high energy is observed in a resource having no LTE transmission. The "resource having no LTE transmission" may be a resource set as implicit resources or may be a resource where an LTC signal is not found.

Proposal 4: Even when there is high load on LTE SL V2V, a solution may be needed to guarantee a transmission chance of IEEE 802.11p In order to secure detectability, transmitting by a UE a detection signal whenever transmitting PSCCH/PSSCH on a subframe may be used as a reference. One method is to use the first symbol and/or the last symbol in frequency resources of a corresponding PSCCH/PSSCH (including a probability of using some of those symbols). Herein, Automatic Gain Control (AGC) may be performed on the first symbol, and TX/RX switching and uplink (UL) TX timing advantage absorbing may be performed on the last symbol. Hereinafter, two options of a LTE SL V2V detection signal will be described.

Figure 8:
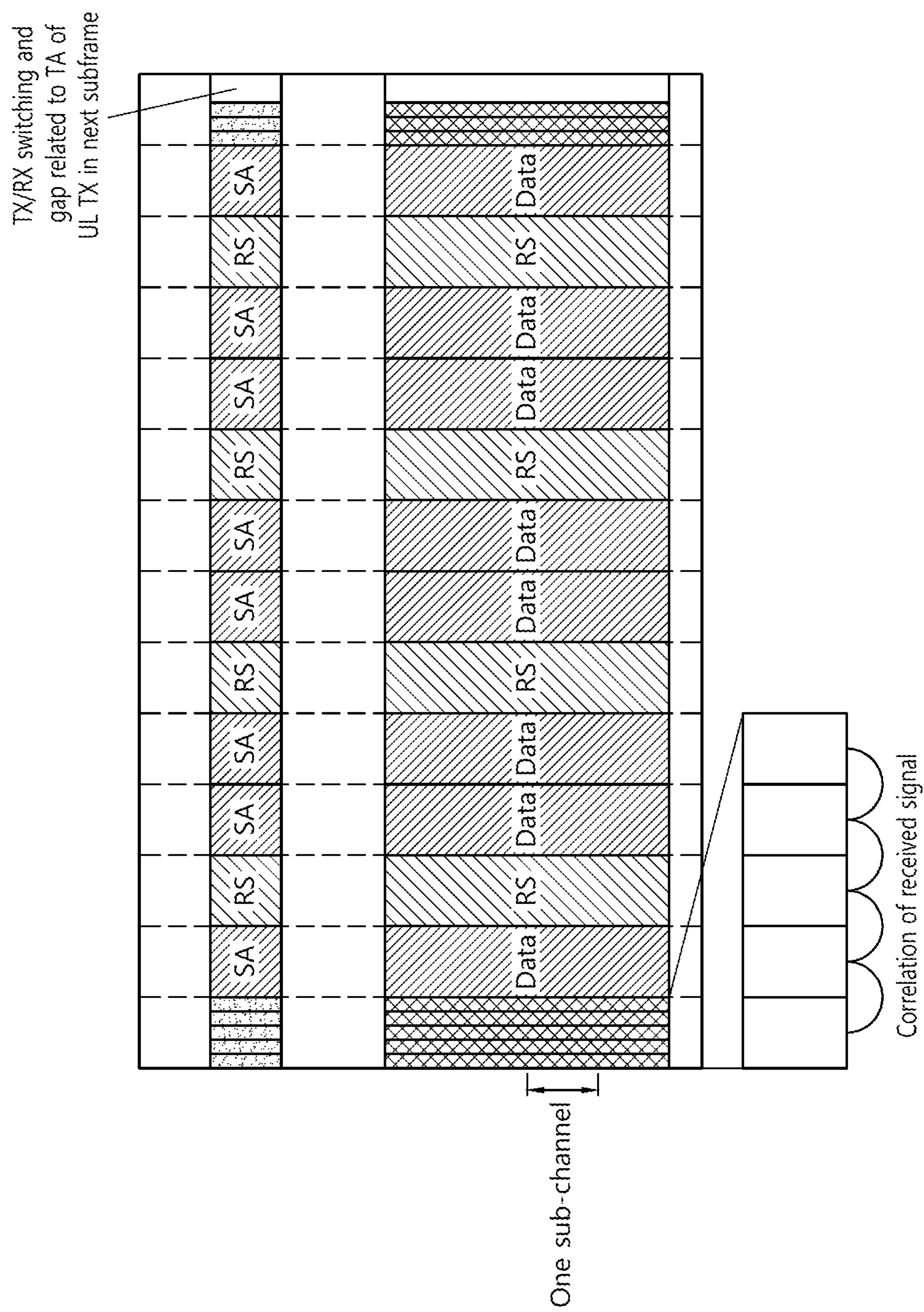
FIG. 8 illustrates an example of a LTE SL V2V detection signal using time repetition of a short sequence.

FIG. 8 illustrates an example of a LTE SL V2V detection signal using time repetition of a short sequence.

Referring to FIG. 8, in the first option, a short sequence may be repeated on the first symbol and/or the last symbol. An intended operations of a detection device is delaying a time domain received signal as long as a length of the sequence, and using so-called "delay correlation" of a received signal correlated with a next received signal.

In this operation, the device does not detect the sequence itself but is able to distinguish a specific repetition pattern of a signal in a time domain. Accordingly, the device does not need to know the exact sequence used by a transmitter, and this is an advantage over a detection device using a different RAT.

Figure 9:
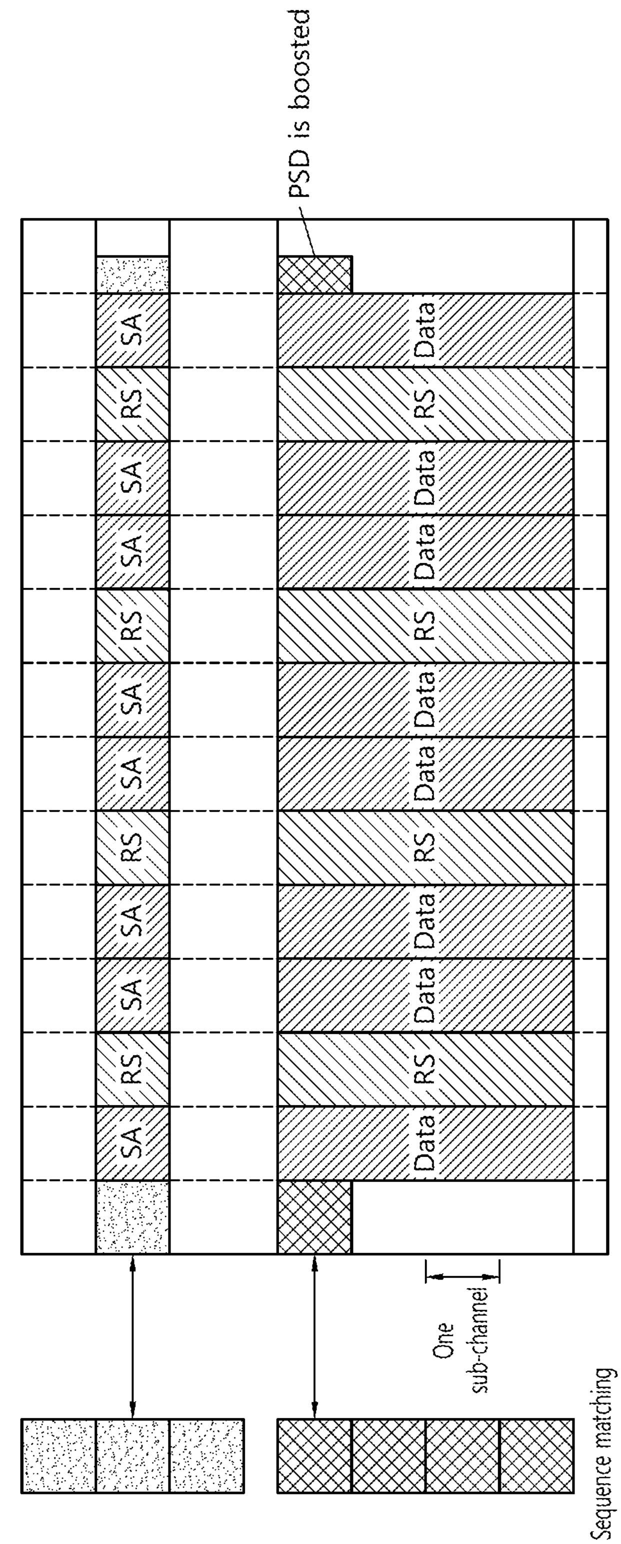
FIG. 9 illustrates an example of an LTE SL V2V detection signal using sequence matching in a frequency domain.

FIG. 9 illustrates an example of an LTE SL V2V detection signal using sequence matching in a frequency domain.

According to FIG. 9, in the second option, a detection device is able to match each sequence of each frequency resource. Since a transmission bandwidth of PSSCH is possibly not informed to the detection device, a size of a resource block (RB) of a detection signal may be, for example, fixed to one sub-channel size so as to use the same sequence in every UE while maintaining a single carrier. In order to support AGC on the first symbol and maintain the same coverage, Power Spectral Density (PSD) needs to be boosted in detection signal w transmission which uses some of a PSSCH transmission bandwidth.

Proposal 5: If a predetermined signal is used for inter-RAT detection, a UE needs to transmit a new LTE SL signal on the first symbol and/or the last symbol of every subframe that transmits PSCCH/PSSCH. Herein, AGC needs to be guaranteed on the first symbol, and TX/RX switching and timing advance absorbing of UL TX need to be guaranteed on the last symbol.

3.3. Use of resources potentially shared with a different RAT

A detect-and-vacate operation assumes a prioritized access to a resource. In other words, when a RAT with a determined priority is detected, a RAT for stopping a different RAT from using a resource is prioritized. Accordingly, it may be necessary to define when a UE performs transmission with a high priority on a resource to be potentially used by a different RAT. In addition, whether or not two RATs are allowed to have the same priority may be further discussed, and, for example, the "First Come First Served (FCFS)" principle may be adapted.

Proposal 6: it may be assumed that, in a detection-and-vacate operation, different RATs in a given resource set have different priorities.

If a low-priority RAT (e.g., RAT A) detects a RAT (e.g., RAT B) from a specific resource set of a low priority, the low-priority RAT (e.g., RAT A) may stop transmission. Regarding this, the question is which resource is used for transmission of RAT A, and especially, whether a predetermined level of a waiting time or reliability requirements are needed for this transmission. In this case, stopping transmission is not reasonable, and thus, it may be possible to basically assume that the RAT A is a different resource set Y having a high priority. Thus, in terms of a RAT, the resource set Y may be used for basic resources, and a resource set X may be a kind of an auxiliary resource set optionally used for offload.

The RAT A may use a resource set X only when offloading is necessary. Otherwise, the RAT A may interfere with RAT B because inter-RAT detection is not perfect. In addition, it is necessary to prevent use of unnecessary multicarrier as much as possible, by considering a limitation on the number of carriers to be used by each UE and overhead/latency of the case of switching and alignment of carriers by a UE. This may mean that a UE does not use a resource set of a low-priority RAT when there is no congestion problem in a resource set of a high-priority RAT.

Proposal 7: In a detect-and-vacate operation, each RAT may be assumed to have the highest-priority resource set. Only when the RAT detects congestion in the highest-priority resource set, the UE may use a different resource.

A resource set in which LTE SL V2V has a low priority level may be set in multiple carriers. In this case, a receiver UE may need to know which carrier is used by a transmitter UE for the purpose of offloading. To support this operation, the UE may broadcast information on a transmission carrier to adjacent UEs.

TABLE 3-continued

| |
|---|
| To support alignment used by carriers over the UEs, a carrier having the first priority from among the carriers may be first considered as a transmission carrier. |
| When time for completely monitoring a carrier switched by the UE is not allowed, random resource selection discussed for V2P or limited resource detection may be considered a fallback operation. On the other hand, when each UE has a multi-carrier receiving function and already monitors carrier candidates, this fallback operation may not be necessary. Thus, an assumed subcarrier capacity may be discussed first. |
| Proposal 8: when a detect-and-vacate operation is performed using multiple carriers, how to align transmission carriers among UEs needs to be discussed. |
| 3.4. Coexistence of inter-RAT in the case of V2P |
| In the case of V2P, a P-UE transmission and V-UE reception scenario is prioritized during SI step. However, if a mechanism of detection-based coexistence of RATs is used even for V2P, it is necessary to consider a limited P-UE RX capability. One option is to implement each P-UE to detect any other RAT before transmission, but this may require more battery consumption and an RX function of PC5 carrier. There is a limitation that, even though partial sensing operation, a P-UE is not able to detect any other RAT in a subframe which is not monitoring. |
| To solve this problem, supporting an eNB may be considered. Each V-UE may report detection of a different RAT in addition to its location information to an eNB. Accordingly, the eNB may forward the information to a P-UE, and the P-UE may determine transmission on the basis of the location information of the V-UE from the forwarded information. Selectively, the eNB may activate/deactivate a resource pool for P-UEs in a region on the basis of reports from V-UEs. |
| Proposal 9: If a detect-and-vacate operation is performed in the case of V2P, a solution for allowing a P-UE to recognize a different RAT may be needed. V-UE reporting and eNB forwarding may be considered. |
| 3.5. The above-described proposals may be summarized as below |
| Proposal 1: Regarding an LTE SL V2V design for coexistence with Dedicated Short-Range Communication (DSRC), expansion about coexistence with NR V2X needs to be considered. |
| Proposal 2: For the options "geographical location and data base" and "GNSS timing-based time haring between systems", RAN1 specification support may not be needed. |
| Proposal 3: When high energy is observed in a resource having no LTE transmission, an LTE UE may detect a different RAT. The "resource having no LTE transmission" may be a resource set along with implicit resources or a resource in which an LTE signal is not found. |
| Proposal 4: Even when there is high load for LTE SL V2V, a solution may be necessary to guarantee a transmission chance of IEEE 802.11p. |
| Proposal 5: When a predetermined signal is used for inter-RAT detection, a new LTE SL signal needs to be transmitted from the first symbol and/or the last symbol in every subframe on which a UE transmits PSCCH/PSSCH. Herein, AGC needs to be guaranteed in the first symbol, and TX/RX switching and UL TX timing advance absorbing needs to be guaranteed on the last symbol. |
| Proposal 6: In a detect-and-vacate operation, different RATs in a given resource set are assumed to have different priorities. |
| Proposal 7: In a detect-and-vacate operation, each RAT may be assumed to have the highest-priority resource set. When the RAT detects congestion in the highest priority set, a UE may be consider using a different resource set. |
| Proposal 8: When a detect-and-vacate operation is performed using multiple carriers, how to align transmission carriers among UEs needs to be discussed. |
| Proposal 9: When a detect-and-vacate operation is performed in the case of V2P, a solution for allowing a P-UE to recognize a different RAT may be needed. V-UE reporting and eNB forwarding may be considered. |

Even examples of the above-described coexistence method may be included as one of methods of implementing the present invention, and thus, it is obviously that it can be regarded as a kind of coexistence method. In addition, the above-described coexistence methods may be implemented independently and may be implemented in the form of a combination (integration) of some coexistence methods. For example, the present invention describes the coexistence methods based on a 3GPP LTE system for convenience of explanation, but the range of a system to which a coexistence method is applicable may expand to systems other than a 3GPP LTE system.

For example, the coexistence methods of the present invention may be applicable even for D2D communication. Herein, for example, the D2D communication indicates that a UE performs communication directly with other UE using a radio channel, and, herein, for example, the UE indicates a user's terminal, but a network device such as a base station may be regarded as a kind of UE when transmitting/receiving a signal according to a communication method between UEs.

In addition, for example, the coexistence methods of the present invention may be applicable limitedly only to MODE 2 V2X operation (and/or MODE 1 V2X operation). In addition, for example, the coexistence methods of the present invention may be applicable limitedly only to a V-UE(s) (or P-UE(s)) (and/or a V2X UE(s) provided with a (dedicated) RX (or TX) chain about a V2X carrier (or channel/band)).

Hereinafter, the present invention will be described.

In the following methods, a UE may be a UE having a limited capability. For example, a UE may be a UE having a limited RX (or TX) chain/circuit capability (and/or a UE having a limited battery capability (or duration/time/consumption). For example, a UE may be a UE which includes only one receiver (or transceiver) not to be able to simultaneously receive (or transit) a signal for WAN communication at a first frequency and a signal for V2X communication at a second frequency. The UE may be a pedestrian UE (Pedestrian UE: P-UE which is carried out by a pedestrian) which has relatively huge constraints in terms of hardware implementation costs/increase in complexity/battery consumption (compared to a UE installed at a vehicle (Vehicle-UE: V-UE)).

Hereinafter, there is proposed a method by which the UE efficiently performs a V2X message transmission (or reception) operation on a V2X sub-carrier or V2X resource pool (a subcarrier/resource pool for which V2X communication is set).

Hereinafter, for convenience of explanation of the proposed method, for example, a P-UE #K is assumed to have single TX circuit (RX chain/circuit) capability and two TX circuits (TX chain/circuit) capability.

In addition, P-UE #K is assumed to perform wide area network (WAN) DL/UL communication on WAN DL/UL subcarrier #X (which can be understood as subcarriers for which WAN DL/UL communication is set) and perform a V2X message transmission (or reception) operation (together) on V2X subcarrier #Y. However, the proposed methods of the present invention may be applicable not just to this case, but also to other various cases (e.g., the case of requiring more than a RX (or TX) circuit capability of a V2X UE).

The P-UE #K may be understood to have no "dedicated RX (or TX) chain/circuit)" on the V2X subcarrier #Y on which V2X communication is implemented. That is, it may be understood that only the "TX(or RX) chain/circuit" exists on the V2X subcarrier #Y.

A "transmission resource collision avoidance operation (that is, sensing operation)" between different V2X UEs is more helpful to improve V2X communication performance, compared to a random method of randomly selecting/reselecting a transmission resource by V2X UEs.

The sensing operation may be performed (A) through decoding of "scheduling assignment (SA) channel (e.g., PSCCH)", and/or measurement (e.g., "PSSCH-RSRP") on a pre-defined channel/reference signal (RS which is, for example, "DM-RS") on a "DATA channel (e.g., PSSCH)" associated with the (corresponding) decoded PSCCH, and/or (B) energy measurement (e.g., "S-RSSI").

Hereinafter, for example, the term such as a subcarrier/band/channel used herein may be understood to indicate a resource pool.

<Proposed Methd #1>

When performing a V2X message transmission operation on V2X subcarrier #Y, P-UE #K (having a limited RX circuit capability) does not use (or switch) a reception circuit (RX chain/circuit) used for a WAN downlink reception operation (WAN DL carrier #X) (regardless of whether a sensing operation is set) but may (always) (re)select a transmission resource (on V2X subcarrier #Y) for V2X message transmission by using a random method.

For example, a V2X message may be (periodically) transmitted based on a period value (which is determined on an upper layer (of a UE)) (and/or transmitted based on a (periodic) resource (re)selected (or reserved) based on the corresponding period value). Herein, for example, when (re)selecting (or reserving) (transport block (TB)-related) (data/scheduling assignment) transmission resource, P-UE #K may performs (re)selection (or reservation) limitedly on remaining subframes, except for a subframe to which a (TB-related) (data/scheduling assignment) transmission resource (re)selected (or reserved) belongs, at a previous (period (or transmission resource (re)selection (or reservation)) time (whereby a half-duplex problem can be alleviated).

For example, when (re)selecting (or reserving a transmission resource), the P-UE #K may transmit a V2X message by selecting a specific subframe(s) from (re)selected (or reserved) resource candidates composed of 100 subframes (which is assumed to be indexed from 0 to 99). If selecting the N-th subframe (from the (re)selected (or reserved) resource candidates) at the previous transmission resource (re)selection (or reservation) time, the P-UE #K may (randomly) select a specific subframe from remaining subframes, except for the N-th subframe (in the (re)selection (or reservation) resource candidates), at a next transmission resource (re)selection (or reservation) time.

Herein, for example, the P-UE #K may perform a V2X message transmission operation using "UU interface" or a WAN uplink (when a sensing operation is set). Such an operation may be understood to be switching between PC5 and UU (or the WAN uplink).

<Proposed Method #2>

The P-UE #K (having a limited RX circuit capability) may assume that a "sensing gap (or sensing resource) or reception gal (or reception resource) or a partial sensing gap (or partial sensing resource)" of a preset or signaled pattern (e.g., a "bitmap/period/offset") exists on a time/frequency resource and/or V2X message transmission (a time/frequency resource prior to a (scheduling assignment) period (or time) for performing a resource (re)selection (or reservation) operation). Herein, for example, the term "sensing gap or reception gap" may indicate a partial sensing gap (which is be set as the same in the following). Herein, for example, the "sensing gap" may indicate a resource on which a UE needs to perform sensing to (re)select (or reserve) a resource (e.g., a subframe) used to transmit a V2X signal, and, in this aspect, the sensing gap may be indicated as a sensing resource. Similarly, the "reception gap" may be indicate a resource on which the UE needs to receive (or decode) a signal (or channel) to perform the sensing (and/or a resource for PSSCH-RSRP/S-RSSI measurement), and, in this aspect, the reception gap may be indicated as a reception resource. In addition, the "partial sensing gap" may indicate a (some) resource set for the sensing, and, in this aspect, the partial sensing gap may be indicated as a partial sensing resource.

On the sensing gap (or resource) (or the reception gap (or resource)/partial sensing gap (or resource), which is set as the same in the following), the P-UE #K may switch (or use) its own reception circuit used for a WAN downlink reception operation (WAN DL subcarrier #X) and or perform a sensing operation (or a partial sensing operation). The sensing operation may include at least one of (1) an operation of acquiring information on occupied resources by performing a decoding operation on scheduling assignment channels transmitted by a different V2X terminal or 2) an operation of acquiring information on resources having aggressive interference or resources occupied by a different V2X terminal through an (energy) measurement operation (e.g., PSSCH-RSRP, S-RSSI) on a defined channel/reference signal.

Through such a sensing operation, transmission resource avoidance with a different V2X terminal is possible.

Figure 10:
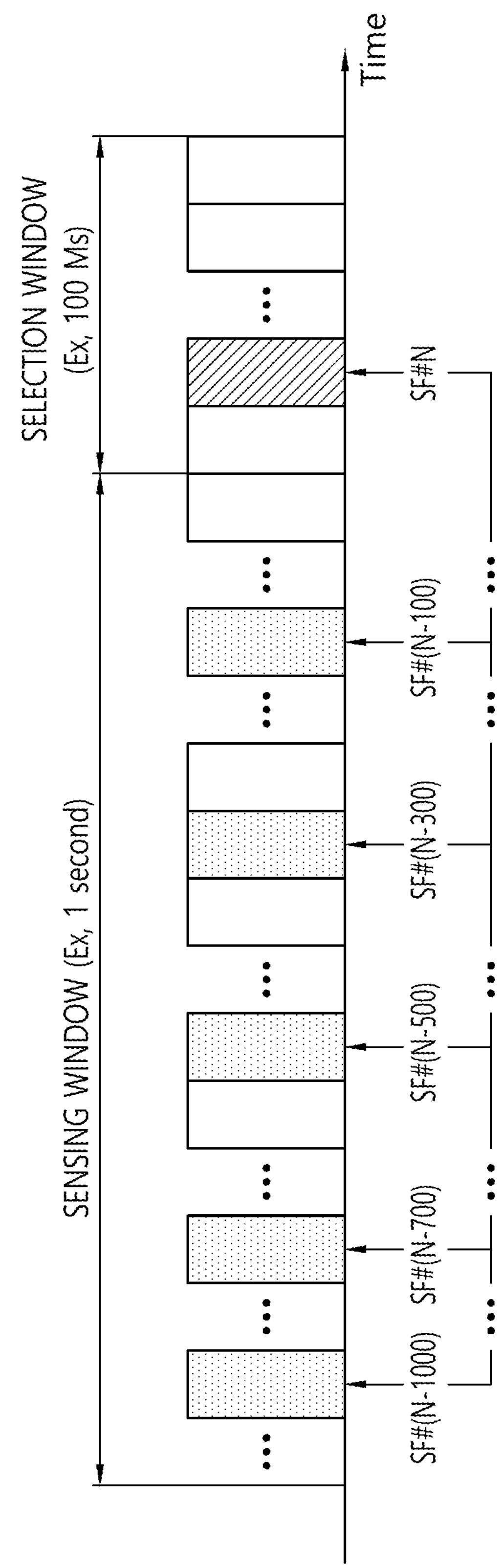
FIG. 10 shows an example of a V2X transmission resource (re)selection (or reservation) in a partial sensing operation according to <Proposed Method #2>.

FIG. 10 shows an example of a V2X transmission resource (re)selection (or reservation) in a partial sensing operation according to <Proposed Method #2>.

Referring to FIG. 10, a UE (P-UE, which is set as the same in the following) may determine (or trigger) (re) selection (or reservation) of a resource for V2X signal transmission (depending on whether a predefined condition is satisfied). For example, suppose that (re)selection (or reservation) of a resource for V2X signal transmission is determined (or triggered) on subframe #m. In this case, the UE may (re)select (or reserve) the resource for V2X signal transmission in a subframe section from subframe #m+T1 to subframe #m+T2. The subframe section from subframe #m+T1 to subframe #m+T2 will be referred to as a selection window in the following. The selection window may be, for example, composed of 100 consecutive subframes.

In the selection window, the UE may select at least Y number of subframes as resource candidates. That is, the UE may need to consider at least the Y number of subframes in the selection window to be resource candidates. The value of Y be a preset value or may be a value set by a network. However, how to select the Y number of subframes in the selection window may be the question of UE implementation. That is, if the value of Y is, for example, 50, which 50 subframes from the 100 subframes of the selection window may be selected by the UE. For example, the UE may select 50 subframes with odd subframe numbers or 50 subframes with even subframe numbers from among the 100 subframes. Alternatively, the UE may select 50 subframes according to a random rule.

Meanwhile, to (re)select (or reserve) a specific subframe, for example, subframe #N(SF #N), from among the Y number of subframes as a V2X transmission subframe capable of transmitting a V2X signal, the UE may need to sense at least one subframe linked with or associated with the subframe #N. A (whole) subframe section defined for sensing is referred to as a sensing window and may be, for example, composed of 1000 subframes. That is, a sensing window may be 1000 ms or one second. For example, a UE may be able to sense subframes corresponding to subframe #N−100*k (herein, K may be a set of respective elements within a range of [1, 10] and may be a value which is preset or which is set by a network) within a sensing window.

FIG. 10 illustrates an example in which the value of k is {1, 3, 5, 7, 10}. That is, a UE may sense subframes #N−1000, #N−700, #N−500, #N−300, and #N−100, estimate/determine whether subframe #N is being used by a different V2X UE (and or whether there is interference (equal to or greater than a pre-set (or signaled) threshold value) on the subframe #N), and lastly select the subframe #N based on the result. Since a P-UE is sensitive to battery consumption compared to a V-UE, the P-UE performs partial sensing: that is, the P-UE senses some of subframes in a sensing window, rather than all of the subframes.

Figure 11:
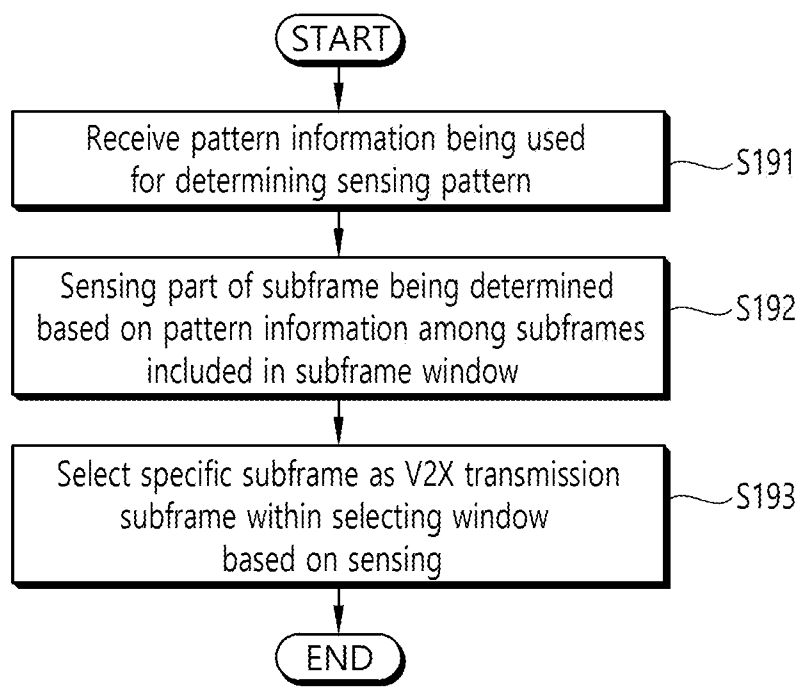
FIG. 11 shows an example of (re)determining (or selecting/reserving) a V2X transmission subframe (or resource) according to <Proposed Method #2>.

FIG. 11 shows an example of (re)determining (or selecting/reserving) a V2X transmission subframe (or resource) according to <Proposed Method #2>.

Referring to FIG. 11, a UE receives pattern information used to determine a (partial) sensing pattern (S191). The pattern information may be provided by a network through an RRC (or SIB) message or the like.

The following table shows an example of pattern information.

TABLE 4

```
-- ASN1START
SL-P2X-SensingConfig-r14 ::=        SEQUENCE {
   minNumCandidateSF-r14           INTEGER (1..13),
   gapCandidateSensing-r14            BIT STRING (SIZE (10))
}
-- ASN1STOP
```

In the above table, "minNumCandidateSF" indicates the minimum number of subframes required to be included in possible resource candidates. As described above, a UE needs to consider at least Y number of subframes in a selection window as resource candidates, and, in this case, "minNumCandidateSF" may indicate the value of Y.

"gapCandidateSensing" indicates a specific subframe to be sensed when the specific subframe is considered resource candidates. As described above, when specific subframes, for example, subframe #N(SF #N), is selected as a resource candidate from among the Y number of subframes, it is necessary to sense subframes corresponding to #N−100*k in a sensing window, and, in this case, the "gapCandidateSensing" may indicate the value of K using a 10-bits string. For example, in the case where the value of K is {1, 3, 5, 7, 10}, it may be expressed as ""1001010101".

The UE senses some subframes which is determined, based on the pattern information, from the subframes in the sensing window (S192). That is, the UE performs partial sensing. The partial sensing has been already described in detail with reference to FIG. 10.

The UE selects a specific subframe in the selection window as a V2X transmission subframe based on the sensing (S193).

Figure 12:
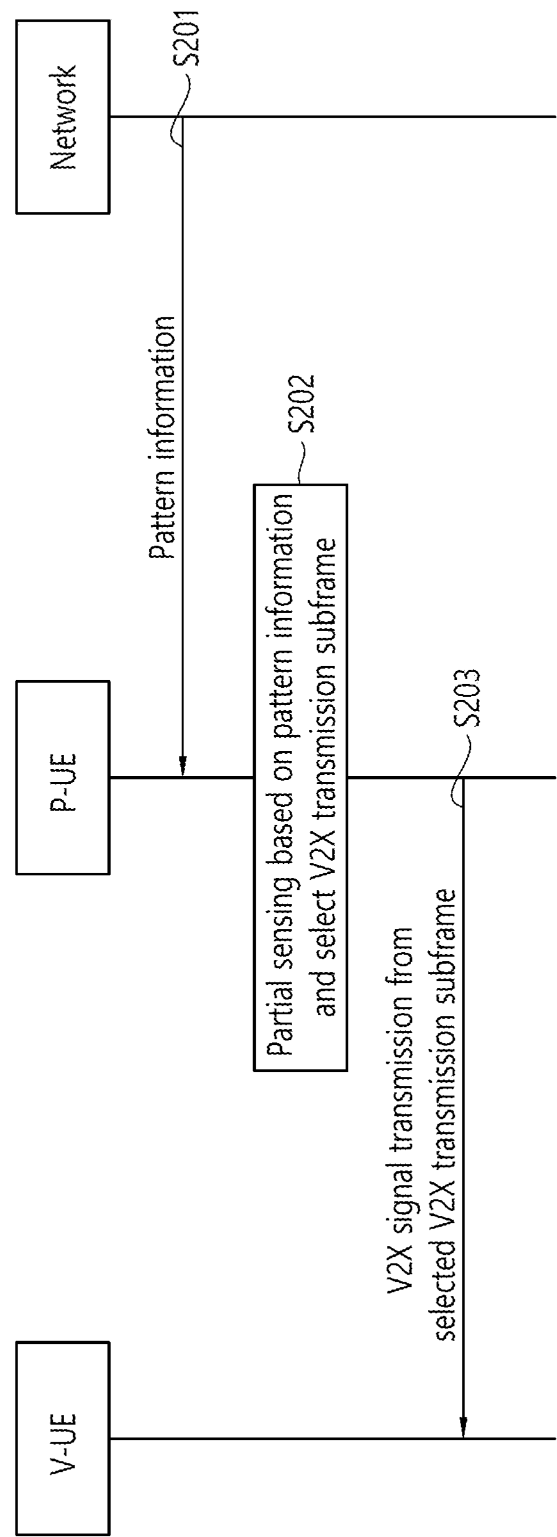
FIG. 12 illustrates a method of communication among a P-UE, a V-UE, and a network according to <Proposed Method #2>.

FIG. 12 illustrates a method of communication among a P-UE, a V-UE, and a network according to <Proposed Method #2>. Herein, for example, FIG. 12 assumes the case where a P-UE transmits a V2X signal to the V-UE, but, generally, the V2X signal transmitted by the P-UE may target not just the V-UE, but other entities (e.g., P-UE, V-UE, (UE-TYPE) RSU, etc.).

Referring to FIG. 12, a network provides a (sensing) pattern to the P-UE (S201). The pattern information has been already described with reference to Table 4.

The P-UE performs partial sensing based on (sensing) pattern information, and selects a V2X transmission subframe on the basis of the result (S202).

The P-UE transmits a V2X signal to the selected V2X transmission subframe (S203).

<Proposed Method #3>

(A P-UE having a limited RX circuit capability, for example) P-UE #K may report (to a network through a WAN UL) information on a sensing gap (or resource), a reception gap (or resource), or a partial sensing gap (or resource of its preferred form or pattern. Herein, for example, the corresponding information on the sensing gap (or resource), the reception gap (or resource), or the partial sensing gap (or resource) may be in the form of a bitmap and/or the form indicating a period/offset value (of the sensing gap (or resource) (or reception gap (or resource)/partial sensing gap (or resource))).

A preferred sensing gap (or resource) (or a reception gap (or resource)/partial sensing gap (or resource) form/pattern may include some time/frequency resource regions which has a relatively low energy measurement value (and/or a "congestion level" value) after P-UE #K performs a measurement (or sensing) operation (on a pre-set or signaled time/frequency resource section).

<Proposed Method #4>

(In the case where the above Proposed Method #3 is applied) when sensing gap (or resource) (or reception gap (or resource) or partial sensing gap (or resource)) pattern (received from a base station) does not cover the whole (or more than a pre-set (or signaled) (threshold) proportion value) (previous) time/frequency resource (or pool) region necessary for a sensing operation (relating to a pool (or resource) on which a V2X message transmission operation is to be performed) (e.g., when the corresponding sensing gap (or resource) (or reception gap (or resource)/partial sensing gap (or resource) covers only some resources (or subframes) in a sensing window), the corresponding V2X message transmission operation may be performed according to the following rule.

Herein, for example, when the V2X message transmission operation is performed on V2X transmission resource pool #J (associated with scheduling assignment pool (or period)#J), a sensing operation on the corresponding V2X transmission resource pool #J may be performed on a previous time frequency resource V2X transmission resource pool #(J−1) (e.g., which is associated with scheduling assignment/period #(J−1)). As described above, a sensing operation based on a sensing gap (or resource) (or reception gap (or resource)) may be understood as a "partial sensing operation".

(Example #4-1) On a sensing gap (or resource) (or reception gap (or resource or partial sensing gap (or resource), which will be set as the same in the following) (received from a base station), it is possible to perform an operation of avoiding a transmission resource collision with a different V2X UE by using only acquired sensing information (e.g., information on a resource occupied by the V2X UE, and information on a resource having aggressive interference).

For example, (if a sensing gap (or resource) (or reception gap (or resource)partial sensing gap (or resource) does not cover the whole (single) repetition period (or sensing window) in the case another UE repeatedly use a resource at a predetermined interval), a P-UE may (re)select (or reserve) its optimal transmission resource only in a resource which is sensed using the sensing gap (or resource) (or the reception gap (or resource)partial sensing gap (or resource)).

For example, in the case of (re)selecting (or reserving) a resource having the lowest energy, it may be limited to (re)selecting (or reserving) a resource having the lowest energy from among resources belonging to a sensing gap (or resource) (or reception gap (or resource) or partial sensing gap (or resource)).

For example, in the case of figuring out a resource occupied by a UE through decoding of a scheduling assignment channel of a different UE, it may be limited to (re)selecting (or reserving) only a "data resource" which is allowed to be scheduled in a scheduling resource belonging to a sensing gap (or resource) (or reception gap (or resource) or partial sensing gap (or resource)).

When (re)selecting (or reserving) a (TB related) (data or scheduling assignment, which will be set as the same in the following) transmission resource at the current transmission resource (re)selection (or reservation) (period) time, P-UE #K may limitedly perform (re)selection (or reservation) in remaining subframes, except for a subframe to which a (TB related) (data or scheduling assignment) transmission resource (re)selected (or reserved) at a previous (re)selection (or reservation) (period) time belongs. In doing so, it is possible to alleviate a half-duplex problem in a transmission resource (re)selection (or reservation) operation environment based on imperfect sensing information). The half-duplex problem means that, because a UE is not capable of transmitting and receiving a signal at the same time, when the UE uses repeatedly use the same resource (e.g., a frequency resource) for signal transmission/reception, the UE is not able to repeatedly perform signal reception/transmission.

Figure 13:
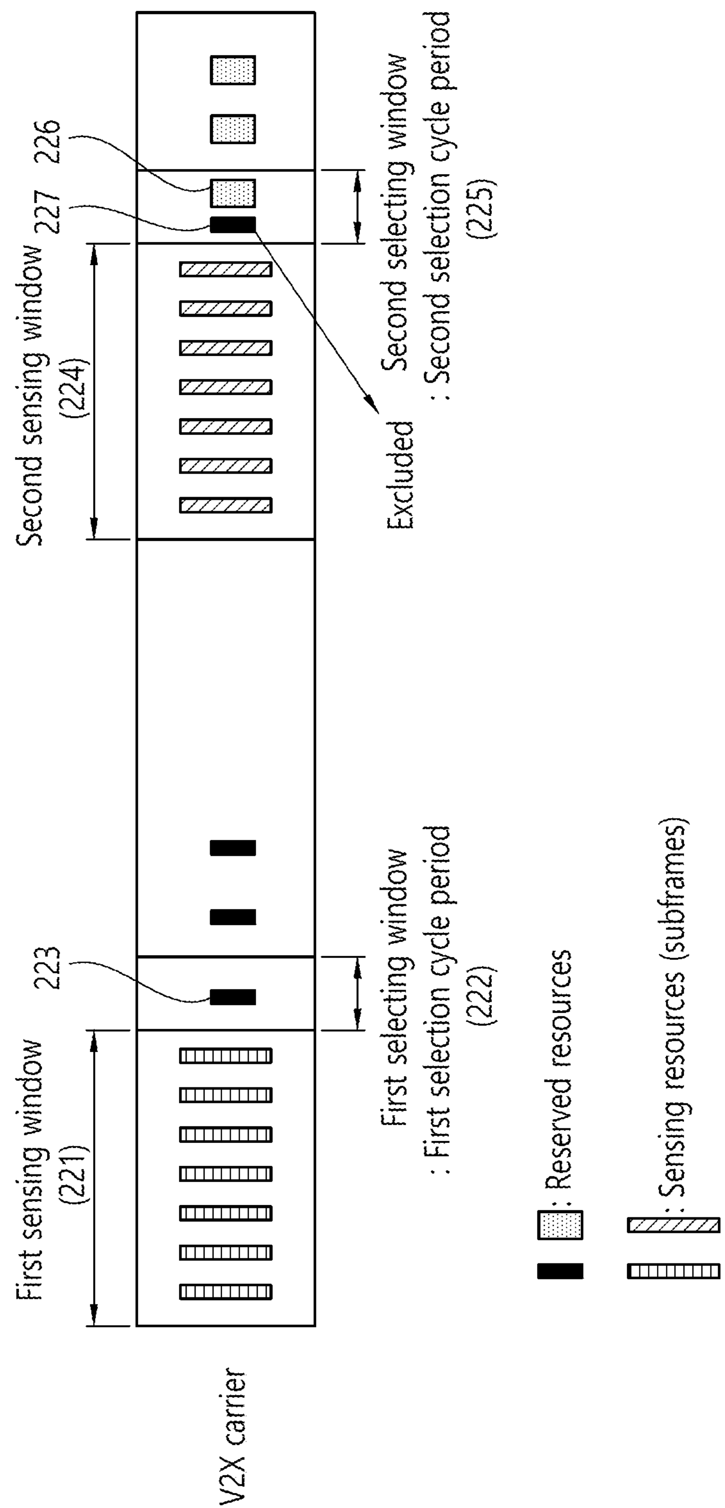
FIG. 13 illustrates an example of a method of (re)selecting (or reserving) a V2X transmission resource according to Example #4-1.

FIG. 13 illustrates an example of a method of (re)selecting (or reserving) a V2X transmission resource according to Example #4-1.

Referring to FIG. 13, at a first transmission resource (re)selection (or reservation) time (or period), a UE may select a first subframe 223 in a first selection window 222. Linked Subframes to be sensed in order to select the first subframe 223 are expressed as sensing resources in the first sensing window 221.

At a second transmission resource (re)selection (or reservation) time (or period, the UE may select a second subframe 226 in a second selection window 224. At this point, the second subframe 226 is a subframe which does not overlap a subframe 227 at the same position (or order) as that of the first subframe 223 (in the selection window). That is, the second subframe 226 is selected from among remaining subframes except for the subframe having the same location/subframe order (or number) as that of the first subframe 223 in the second selection window. Linked subframes to be sensed in order to select the second subframe 226 are expressed as sensing resources in the second sensing window 224.

According to this method, different resources are selected from the first selection window and the second selection window, and thus, it is possible to alleviate the half-duplex problem.

A sensing operation on an excluded subframe (or resource) and a linked sensing resource may be omitted, and/or the excluded subframe (or resource) and the linked sensing resource may not be included in a sensing gap (by reporting relevant information to a base station by P-UE #K).

Figure 14:
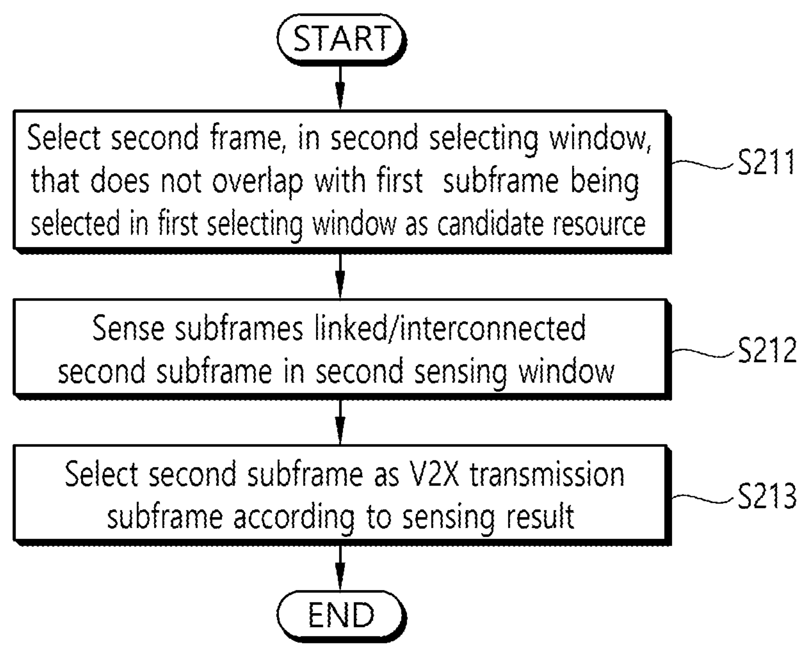
FIG. 14 illustrates a method of (re)selecting (or reserving) V2X transmission resource according to Example #4-1.

FIG. 14 illustrates a method of (re)selecting (or reserving) V2X transmission resource according to Example #4-1.

Referring to FIG. 14, in a second selection window, a UE selects a second subframe, which does not overlap a first subframe selected in the first selection window, as a resource candidate (S211).

The UE senses subframes linked/associated with the second subframe in the second sensing window (S212).

The UE may select the second subframe as a V2X transmission subframe on the basis of the sensing result (S213).

(Example #4-2) For example, a transmission resource (re)selection operation may be performed using a predefined or signaled other method, e.g., a random method.

In another example, a V2X message transmission operation may be performed using "UU interface" or WAN uplink. Such an operation may be understood as switching between PC5 and UU (or WAN uplink).

(Example #4-3) If not receiving sensing gap (or resource) (or reception gap (or resource) or partial sensing gap (or resource)) pattern information from a base station), P-UE #K may (re)select (or reserve) a transmission resource using a pre-defined or signaled other method (or fallback method) (e.g., a random method) (even though a sensing operation is set). Alternatively, a V2X message transmission operation may be performed using "UU interface" (or WAN uplink).

[Proposed Method #5] if a P-UE performs a sensing operation for a long time, it may lead to deterioration of WAN downlink reception performance (due to WAN DL RX chain/circuit switching) and/or may be not good in terms of battery consumption. Alternatively, if a (partial) sensing operation is performed only on a fixed (or (semi-)static) time/frequency resource region for a short time or a limited period of time, it may deteriorate accuracy of energy sensing and transmission resource collision avoidance performance. Considering the above, (partial) sensing operation-related parameters, for example, a length of a section on which the (partial) sensing operation is to be performed (sensing duration), and a (partial) sensing pattern (which indicates a form (or pattern)/period/offset of the sensing operation, and which can be provided in a bitmap form) may be set to be subject to "(time) hopping" and/or "randomization" according to a pre-defined rule.

"(time) hopping (pattern)" and/or "randomization (pattern)" may be randomized between different V2X UEs. For example, the randomization may be performed by a function which is pre-defined based on at least one of input parameters such as ID of a transmitter UE, ID of a receiver UE, a (resource/pool) (period) index on which a V2X message transmission operation is performed, and a scheduling (resource/pool) (period) index.

Meanwhile, (although having a RX chain/circuit capability) a UE may have a limited TX chain/circuit capability about a plurality of subcarriers. In this case, the UE may sense, out of resources belonging to a pre-defined or signaled "TX gap", an associated sensing resource (which is associated with a resource in the TX gap) and limitedly (re)select its optimal transmission resource on the basis of the result.

The TX gap may be understood as a resource region in which V2X message transmission has a relatively high priority compared to WAN UL transmission.

In this case, a V2X UE may (re)select (or reserve) a resource(s) not belonging to the TX gap to be used for transmission of a V2X message, and therefore, it is possible to alleviate the problem of omission (or dropping) of the transmission of the V2X message due to overlapping with the WAN UL transmission (on the same (or different) subcarrier) (and/or allocation of transmission power with a low priority).

The P-UE #K having the limited TX chain/circuit capability may report a network of TX gap information of a preferred form (or pattern) (e.g., "bitmap/period/offset") (through a WAN UL).

The preferred TX gap form (or pattern) may include (some) (time/frequency) resource regions which has a relatively low (energy) measurement value (and/or "congestion level" value) after the P-UE #K performs a measurement (or sensing) operation (on a pre-set (or signaled) (time/frequency) resource (section)).

Alternatively, the TX gap may be applied commonly to subcarriers that perform V2X communication. When the TX gap is set (or applied) (commonly applied to the subcarriers), it is possible to alleviate "V2X communication performance degradation", which occurs because transmission power is distributed to "WAN UL transmission" on the basis of a high priority when "WAN UL transmission" and "V2X message transmission" occur at the same time or when "WAN UL transmission" and "V2X message transmission" partially overlap with each other in a time domain.

In other words, when WAN UL transmission" and "V2X message transmission" (partially or entirely) overlap with each other on different subcarriers, it may be understood that transmission power is allocated (or distributed) to the V2X message transmission with a priority relatively higher than that of the WAN UL transmission. If this rule is applied, it is possible to alleviate degradation of performance of V2X communication (or Public Safety (PS) communication) which occurs because low transmission power is allocated (or distributed) to V2X message transmission.

Alternatively, from the perspective of one V2X UE, when "WAN UL transmission" and "V2X message transmission" occur at the same time or when "WAN UL transmission" and "V2X message transmission" partially overlap with each other in a time domain, if a section is set as a TX gap, transmission power may be allocated (or distributed) to the V2X message transmission on the basis of a priority relatively higher than that of the WAN UP transmission while a pre-defined or signaled minimum transmission power value may be guaranteed to the WAN UP transmission. If this rule is applied, it is possible to guarantee the minimum performance of the WAN UP communication.

Hereinafter, suppose that a V2X UE capable of (partially) performing a sensing operation (based on scheduling assignment decoding/energy measurement), for example, a V-UE and/or a P-UE, is TYPE #A UE. That is, the TYPE #A UE is a UE capable of performing (partial) sensing.

In addition, suppose that a V2X UE (e.g., a P-UE) incapable of (partially) performing a sensing operation (based on scheduling assignment decoding/energy measurement) is TYPE #B_UE. That is, the TYPE #B_UE is a UE incapable of performing (partial) sensing.

Meanwhile, there may be a variety of types of a V2X transmission resource pool.

Figure 15:
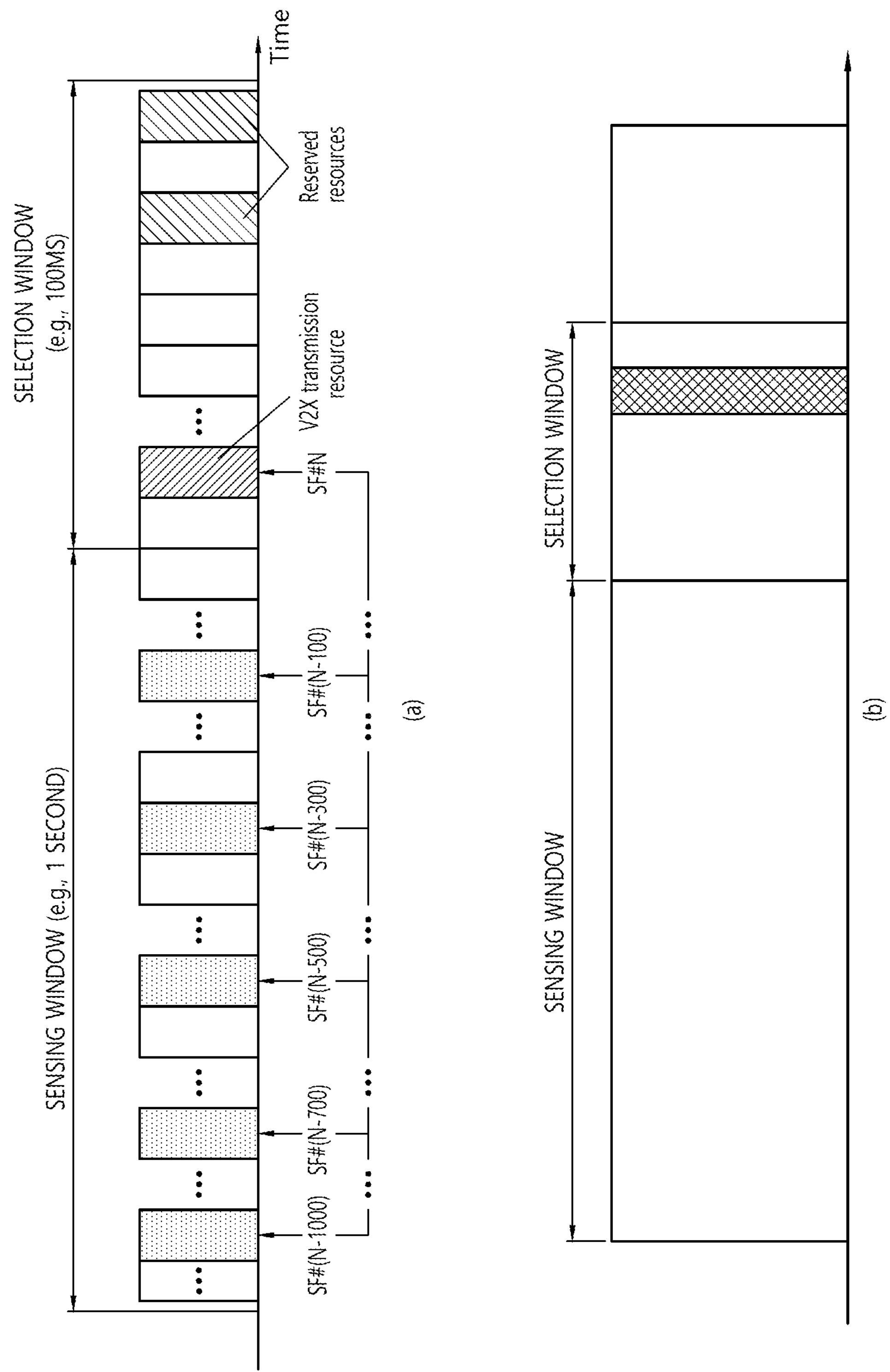
FIG. 15 illustrates an example of a type of a V2X transmission resource pool.

FIG. 15 illustrates an example of a type of a V2X transmission resource pool.

Referring to FIG. 15(*a*), V2X transmission resource pool #A may be a resource pool on which only (partial) sensing is allowed. In the V2X transmission pool #A, a UE needs to select a V2X transmission resource after performing (partial)sensing, wherein random selection is not allowed. The V2X transmission resource selected through the (partial) sensing is semi-statically maintained in a predetermined period, as illustrated in FIG. 15(*a*).

For a UE to perform V2X message transmission on the V2X transmission resource pool #A, a base station may set a (scheduling assignment decoding/energy measurement-based) sensing operation to be (partially) performed. This may be understood that "random selection" of a transmission resource on the V2X transmission resource pool #A is not allowed and that (only) "(partial) sensing"-based transmission resource selection is performed (or allowed). Such setting may be done by the base station.

Referring to FIG. 15(*b*), V2X transmission resource pool #B may b a resource pool on which only random selection is allowed. In the V2X transmission resource pool #B, a UE may not perform (partial) sensing but may randomly select a V2X transmission resource from a selection window. Herein, for example, in a resource pool on which only random selection is allowed, a selected resource may be set (or signaled) not to be semi-statically reserved, unlike in the resource pool on which only (partial) sensing is allowed.

To perform a V2X message operation on the V2X transmission resource pool #B, a base station may set to perform a (scheduling assignment decoding/energy measurement-based) sensing operation. This may be understood that (only) "random selection" of a transmission resource is performed (or allowed) and/or "(partial) sensing"-based transmission resource selection is not allowed on the V2X transmission resource pool #B.

Meanwhile, although not illustrated in FIG. 15, there may be a resource pool on which both (partial) sensing and random selection are allowed. A base station may inform that a V2X resource can be selected (by the UE's implementation) using either of the partial sensing and the random selection from the resource pool.

Figure 16:
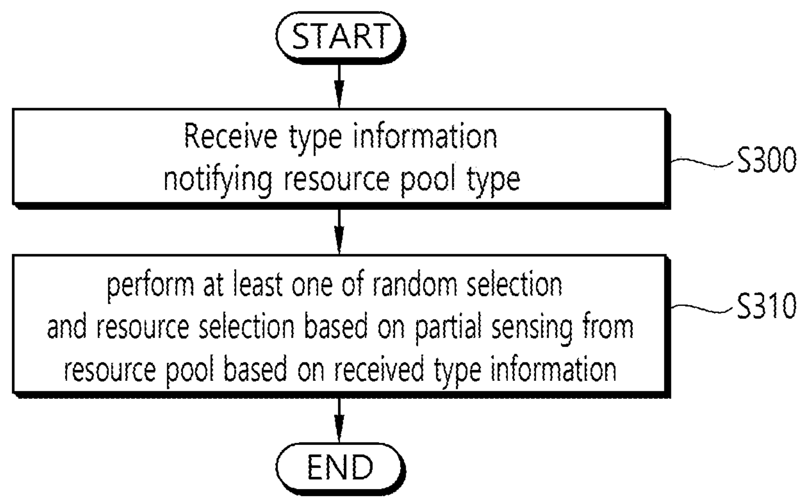
FIG. 16 illustrates an example of a method of selecting a V2X pool when resource pools of multiple types exist.

FIG. 16 illustrates an example of a method of selecting a V2X pool when resource pools of multiple types exist.

Referring to FIG. 16, a UE receives type information indicating a type of a resource pool (S300).

The following table is an example of the type information.

TABLE 5

```
-- ASN1START
SL-P2X-ResourceSelectionConfig-r14 ::=            SEQUENCE {
   partialSensing-r14            ENUMERATED {true}            OPTIONAL, -- Need OR
   randomSelection-r14           ENUMERATED {true}            OPTIONAL -- Need OR
}
-- ASN1STOP
```

In the above table, "partialSensing" indicates that partial sensing is allowed for a UE to select a resource in a corresponding resource pool. "randomSelection" indicates that a UE is allowed to randomly select in a corresponding resource pool. That is, type information indicates a method by which a UE is able to select a V2X transmission resource in a specific resource pool, thereby informing a type of the specific resource pool (e.g., a resource pool in which only partial sensing-based transmission resource selection is allowed, a resource pool in which only random selection-based transmission resource is allowed, and a resource pool in which both partial sensing and random selection-based transmission resource selection is allowed).

The UE may perform at least one of random selection-based resource selection or partial sensing-based resource selection in the resource pool, on the basis of the type information (S310).

For example, a base station may allow TYPE #A UE through a pre-defined signaling (the type information) to perform transmission resource assignment/scheduling in the V2X transmission resource pool #A based on a (scheduling assignment decoding/energy measurement-based) sensing operation, and to perform a (scheduling assignment decoding/energy measurement-based) sensing operation-omitted (or random selection-based) transmission resource assignment/scheduling and V2X message transmission operation in the V2X transmission resource pool #B (or based on random-selection).

Even though a UE is capable of performing a (scheduling assignment decoding/energy measurement-based) sensing operation, it is possible to allow the UE to perform (not just (scheduling-assignment decoding/energy measurement-based) sensing operation-based transmission resource assignment/scheduling and a V2X message transmission operation (on the V2X transmission resource pool #A) a (scheduling assignment decoding/energy measurement-based) sensing operation-omitted transmission resource assignment/scheduling, and V2X message transmission operation (e.g., a random selection technique) (on the V2X transmission resource pool #B). Herein, for example, ((however) if a V2X transmission resource pool required to be subject to (scheduling assignment decoding/energy measurement-based) sensing operation exist in the V2X transmission resource pools), the TYPE #A UE may be set to ((necessarily) use a V2X transmission resource pool on which a (scheduling assignment decoding/energy measurement-based) sensing operation is required to be performed/applied and/or) perform a (scheduling assignment decoding/energy measurement-based) sensing operation-based transmission resource assignment/scheduling, V2X message transmission operation (on the V2X transmission resource pool #A).

In other words, it may be understood to restrict (or prohibit) use of a resource (V2X transmission resource pool) for a V2X UE having a relatively pool sensing-related capability to a V2X UE having a relatively good sensing-related capability. And/or, it may be understood that, since the V2X UE having a relatively good sensing-related capability and the V2X UE having a relatively good sensing-related capability use (or shape) the same V2X transmission resource pool, it is possible to prevent performance of V2X communication of the V2X terminal having the relatively good sensing-related capability from degrading due to transmission resource collision.

Through pre-defined signaling, the base station may inform the TYPE #B_UE of whether to allow "random selection" of a transmission resource only in the V2X transmission resource pool #B or of whether to allow "random selection" of a transmission resource even in the V2X transmission resource pool #A.

It may be set (or signaled) such that, after "(partial) sensing"-based selection of a transmission resource in the V2X transmission resource pool #A, the selected transmission resource is maintained (or reserved) for a predetermined period of time. And/or, it may be set/signaled such that, after "random selection" of a transmission resource in the V2X transmission resource pool #B, the selected transmission resource is not maintained (or reserved) for a predetermined period of time. And/or, it may be set (or signaled) such that a V2X UE having a "(partial) sensing" capability (and/or reception circuit capability) and (having switched (barrowed) a reception chain" used for WAN DL reception) (e.g., a P-UE) selects a transmission resource based on "random selection" and then maintains (or reserves) the selected transmission resource for a predetermined period of time.

Each V2X transmission resource pool is set/signaled to be shared for transmission between which types of V2X UEs. For example, a specific resource pool may be set (or signaled) to be shared between a V-UE and a P-UE, but a different resource pool may be set(or signaled) to be used only by the V-UE (or P-UE). And/or, whether a (P-UE related) resource pool for which "random selection" is allowed partially or entirely overlaps with a "(partial) sensing"-based resource pool (used by the V-UE) (e.g., when the "random selection"-allowed resource pool the "(partial) sensing"-based resource pool (both) overlap, a corresponding resource pool may be understood as a resource pool for which "random selection" -based resource selection and "(partial) sensing"-based resource selection are both (or simultaneous) allowed.

Whether or not random selection is allowed for a specific resource pool and/or a V2X subcarrier or whether sensing-based selection is allowed therefor may be explicitly indicated using type information, as described above, but they may be implicitly implied with a range value of a preset or signaled specific parameter (which is I_VALUE).

For example, when a parameter of a specific resource pool (and/or (V2X) subcarrier) is set (or signaled) not to select (or allow) remaining values except "0", the specific resource pool may be understood as a resource pool used only by a UE (e.g., a P-UE) which performs "random selection" of a transmission resource.

Meanwhile, it may be set (or signaled) such that a specific pool is shared for transmission between a V-UE and a P-UE and/or that a "random selection" allowed (P-UE related) resource pool and a "(partial) sensing"-based resource pool (used by a V-UE) partially or entirely overlap with each other. In this case, a (P-)UE performing "random selection" may need to maintain (or reserve) a transmission resource, "randomly selected" in a corresponding resource pool, for a predetermined period of time. Or, (when it is not set (or signaled) such that a specific pool is shared for transmission between a V-UE and a P-UE and/or that a "random selection" allowed (P-UE related) resource pool and a "(partial) sensing"-based resource pool (used by a V-UE) partially or entirely overlap with each other), a (P-)UE performing "random selection" may not need to maintain (or reserve) a transmission resource, "randomly selected" in a corresponding resource pool, for a predetermined period of time.

Figure 17:
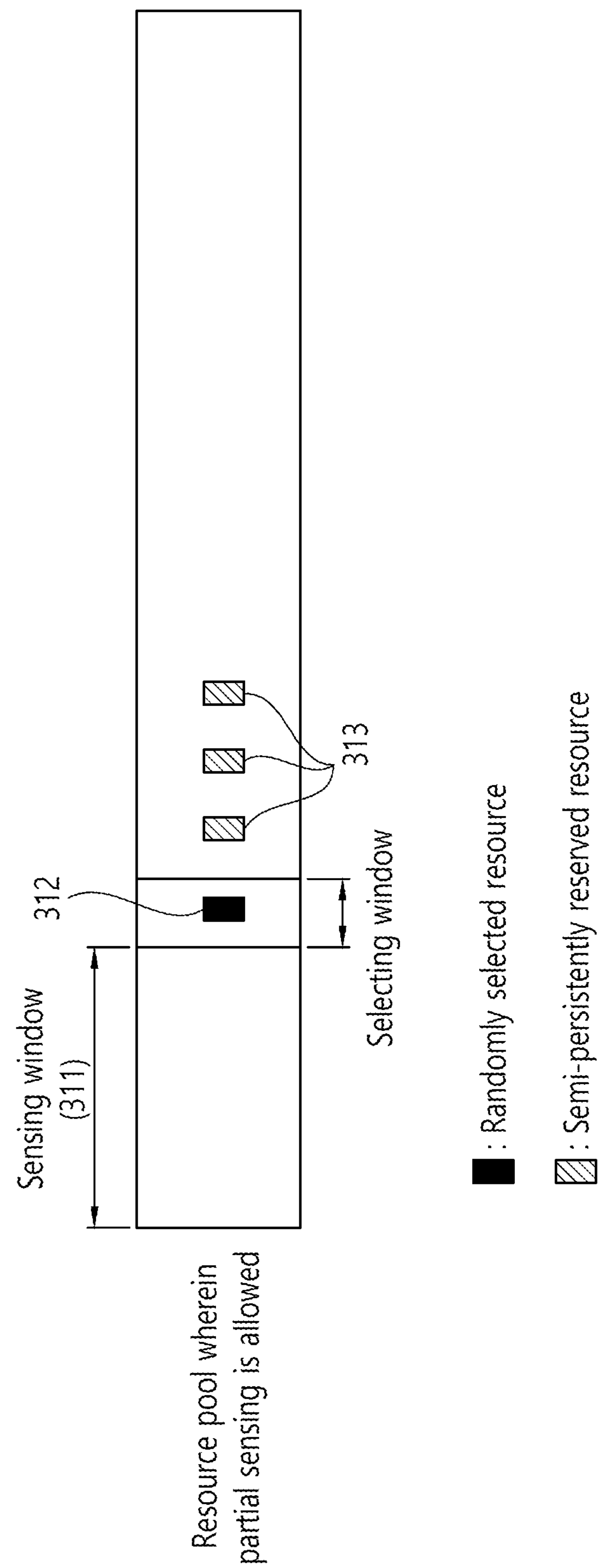
FIG. 17 illustrates an example of an operation that randomly selects a resource in a (partial) sensing-allowed resource pool.

FIG. 17 illustrates an example of an operation that randomly selects a resource in a (partial) sensing-allowed resource pool.

For various reasons, a UE is able to select a V2X transmission resource 312 through random selection in a (partial) sensing-allowed resource pool. For example, when a (partial) sensing-allowed resource pool and a random selection-allowed resource pool overlap with each other (and/or when random selection and (partial sensing) are both allowed in a specific pool), a UE may select a V2X transmission resource through random selection in the (partial) sensing-allowed resource pool.

In this case, the UE may semi-statically reserve resources 313 having the same frequency as that of the V2X transmission resource 312. That is, the UE repeatedly reserve a randomly selected resource over a specific section with a predetermined period. When the resource pool from which the resource is selected overlaps with the (partial) sensing-allowed resource pool even though the UE actually selecting a resource though random selection (and/or when the resource pool from which the resource is selected allows both random selection and (partial) sensing), it is understood that the UE performs a similar operation as that of a UE (performing (partial) sensing operation) in the (partial) sensing-allowed resource pool.

Meanwhile, for a V2X UE (e.g., a P-UE) capable of performing a (scheduling assignment decoding/energy measurement-based) sensing operation only within a pre-set (or signaled) limited time (or frequency) resource section (or region), the same rule (or method) as a rule implemented by TYPE #A UE (or TYPE #B UE) may be applied.

Alternatively, the TYPE #A UE may not (or may) perform a (scheduling assignment decoding/energy measurement-based) sensing operation in order to perform a V2X message transmission operation in the V2X transmission resource pool #B.

For example, a P-UE(s) in (A) "limited sensing_UE" form and/or (B) "TYPE #B_UE" form and/or (C) "limited RX chain/circuit" form (or 'no RX chain/circuit" form) (e.g., when there is no "dedicated RX chain/circuit" on V2X carrier #Y on which V2X communication is implemented (or when there is only "TX chain/circuit)) is hard to (efficiently (or quickly)) know whether a neighboring (or adjacent) other V2X UE(s) (e.g., "V-UE(s)") performs "its (sidelink) service (related V2X message TX operation)" and/or "public safety (PS) service (related V2X message TX operation)".

Accordingly, it is possible to solve (or alleviate) such a problem by applying the following (some) methods.

For example, the following (some methods) may be (widely) used even for a P-UE(s) having the above-described "(limited) capability (or chain/circuit))" (e.g., the "limited sensing_UE" form, "TYPE #B_UE" form, and "limited RX chain/circuit" form (or the form which has only "no RX chain/circuit" form or "TX chain/circuit")) to discover (or detect) whether "another communication (e.g., "DSRC/IEEE 802.11P service", "(different numerology-based) new RAT (NR) eV2X service") exists in a short distance on the same channel (or band/carrier).

Herein, for example, when finding (detecting) that "another communication" exists (in a distance close to the same channel (or band/carrier) (on which V2X communication is implemented)), the P-UE(s) may efficiently coexist (or (collision) avoid) according to the above "proposed coexistence methods (especially what is described in <Method for allowing "V2X communication" and "another communication" to coexist>).

Hereinafter, with reference with drawings, there will be provided more detailed description about a method by which a P-UE, that is, (A) a UE having an insufficient (or limited) sensing capability (e.g., the above-described "limited sensing_UE"), or (B) a UE having no sensing capability (e.g., the above-described "TYPE #B_UE", or (C) a UE having a limited RX chain/circuit (e.g., the above-described "limited RX chain/circuit") because of no "dedicated RX chain/circuit" on V2X carrier #Y, on which V2X communication is implemented, finds (or detects) another communication being implemented on a V2X (Vehicle to X) carrier, determines a V2X message transmission resource on the basis of the detection result, and then transmits a V2X message on the transmission resource.

Figure 18:
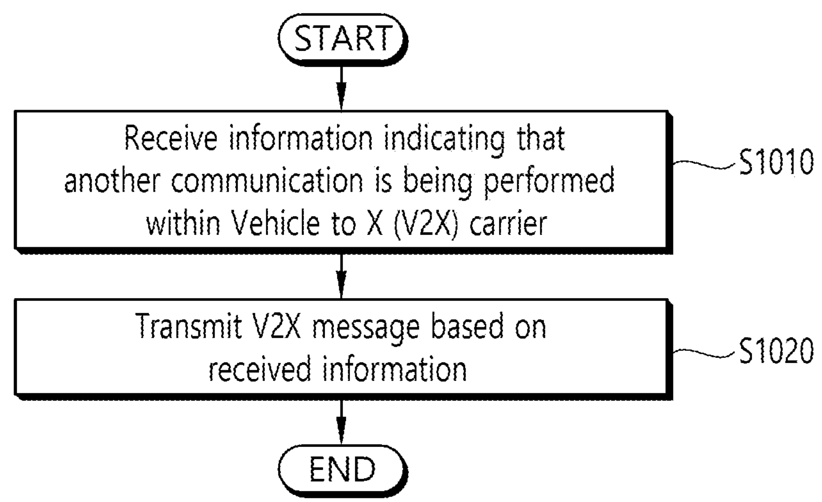
FIG. 18 is a flowchart of a method by which a UE having a limited RX capability transmits a V2X message according to an embodiment of the present invention.

FIG. 18 is a flowchart of a method by which a UE having a limited RX capability transmits a V2X message according to an embodiment of the present invention.

Referring to FIG. 18, a UE may receive information indicating that another communication is implemented (or detected) on a V2X (Vehicle to X) carrier (S1010). In this case, the UE having a limited capability of detecting the implementation of the another communication may be a UE having a limited sensing capability, a UE having no sensing capability, or a UE having no reception chain dedicated to the V2X resource, and the UE may be a P-UE as described above.

Herein, the UE may receive, from (A) other V2X UEs or (B) a base station, information indicating that another communication is implemented (or detected) on the V2X (Vehicle to X) carrier. In this case, the information indicating that another communication is implemented (or detected) on the V2X (Vehicle to X) carrier may be information indicating a type of a sidelink service being performed on the V2X resource. In addition, the information indicating that another communication is implemented (or detected) on the V2X (Vehicle to X) carrier may be information indicating that a service being performed on the V2X resource is a PS (public safety) service. In this case, the information indicating that another communication is implemented (or detected) on the V2X (Vehicle to X) carrier may be information indicating whether communication based on a radio access technology (RAT) different from a RAT of the V2X communication is implemented on the V2X communication.

More specifically,

[Proposed Method #6] (A) A different V2X UE(s) (which is located around (or close to) a P-UE(s)) (e.g., "V-UE(s)") and/or (B) a (serving) base station may inform (through a pre-set (or signaled) channel) (to the P-UE(s)) information about a "type (or content) of an ITS service" which is (currently) operating (or detected) and/or "whether or not it is PS (or non-PS) service" (and/or whether or not "another communication (e.g., "DSRC/IEEE 802.11P service", "(different numerology-based) NR eV2X service") exists), etc.

Herein, for example, this rule may be useful when it is hard for a P-UE(s) to discover the corresponding relevant information as "(sidelink) synchronization signal (SLSS)" (e.g., when "type (or description) of an ITS service" and/or "whether or not it is PS (or non-PS) service" is mapped to "SLSS sequence (or ID)" (and/or when different "SLSS sequence (or ID)" is used for each service (or communication)) (and/or when these information is signaled through "PSBCH" (e.g., a specific (reserved) field on the "PSBCH")), and or when there is no "sidelink (dedicated) RX chain/circuit". Herein, for example, the term "SLSS" may be understood as "PSSS" (or "SSSS").

[Proposed Method #7] For example, when "service type (or kind/description) (information)" (e.g., information on "ITS service type" and/or "whether or not it is PS (or non-PS) service") is mapped to "SLSS sequence (or ID)", (A) a different V2X UE(s) (which is located around (or close to) a P-UE(s)) (e.g., "V-UE(s)") and/or a (serving) base station may inform (through a pre-set (or signaled) channel) (to a P-UE(s)) information on the detected "SLSS sequence (or ID)".

Then, on the basis of the information, the UE transmits a V2X message (S1020). Herein, transmitting the V2X message on the basis of the information may include determining a transmission resource for the V2X transmission message on the basis of the information, and transmitting the V2X message on the transmission resource. Herein, when another communication is implemented on the V2X resource, the V2X UE switches the transmission resource for the V2X message to a V2X resource different from the V2X resource, and transmits the V2X message on the switched different V2X resource. The UE may transmit the V2X message on the switched different V2X resource for a preset period of time, and the switched different V2X resource may be a subframe other than a subframe used in a TB previously transmitted by the UE.

More specifically,

For example, (in the case where [Proposed Method #7] (and/or [Proposed Method #6]) is applied) a P-UE(s) may perform an attempt to detect "SLSS (sequence (or ID)) (or PSBCH)" after conducting "wake-up" only on a pre-set (or signaled) "sidelink synchronization (or PSBCH) resource(s)" (and/or perform "sensing" operation (for detection (or discovery) of another communication") only in pre-set (or signaled) (time (or frequency) resource) (some) sections (e.g., which can be understood as a kind of "partial sensing" operation) (and/or perform "sensing" operation (for detection (or discovery) of "another communication") on a (time (or frequency)) resource (region (or section)) prior to (or just before) a resource selected (or reserved) by itself for V2X message TX (or its transmission operation (time)) (or prior to a pre-set (or signaled) (time (or timing)) offset value (since its transmission operation (time))) (and/or discover information on "type (or description) of an ITS service" which is (currently) operating (or detected) and/or "whether or not it is PS (or non-PS) service" (and/or whether or not "another communication (e.g., "DSRC/IEEE 802.11P service", "(different numerology-based) NR eV2X service" exists), etc.)

Herein, for example, "when another communication" is detected, a rule may be defined for the P-UE(s) (A) to stop "V2X communication" on an existing pool (or carrier/channel/band) (and/or "V2X message TX operation") and/or (B) to (change a pool (or carrier/channel/band), on which "V2X communication" is being implemented, according to a pre-defined (or signaled) rule (priority) and/or) perform "V2X communication" on a (corresponding changed) different pool (or carrier/channel/band) (for a pre-set (or signaled) predetermined period of time) (and/or "V2X message TX operation").

In addition, for example, (in the case where [Proposed Method #7] (and/or [Proposed Method #6]) is applied) when transmitting (or reporting), to a (serving) base station, information on "type (or description) of an ITS service" which is discovered (or detected) and (currently) operating, and/or "whether or not it is "PS (or non-PS) service", and/or whether or not "another communication (e.g., "DSRC/IEE 80211P service", "(different numerology-based) NR 2 V2X service") exists, a different V2X UE(s) (e.g., "V-UE(s)) (which is located around a P-UE(s)) may transmit the information together (additionally) with "its location information" (and/or "information on a location at which the corresponding information is discovered") (and/or a resource pool (or carrier/channel/band) (index) (information) in which ("location-based resource pool (TDM (or FDM)) separation is set (or signaled)) "another communication (and/or "ITS service" and/or "PS (or Non-PS) service") is detected.

Herein, for example, the base station may inform the P-UE(s) (which is on a (reported) close (or the same) location (or region)) of the corresponding information (through a pre-defined signal (e.g., through (WAN) DL (or PDSCH)). Herein, for example, the (serving) base station having received the information (from a V-UE(s)) instruct a P-UE(s) located on a (close or same) location (or region) (and/or pool (or carrier/channel/band)) where "another communication is detected" to perform "activation/deactivation" of a (related) resource pool, and/or to stop "V2X communication" (and/or "V2X message TX operation"), and/or to switch to a different carrier (or channel/band/pool) according to pre-set (or signaled) rule (or priority).

Herein, in another example, when receiving corresponding information (from a (serving) base station), a P-UE(s) may consider (compare) its (current) location (and/or a pool (or carrier/channel/band) on which the "P-UE(s)" (currently) performs V2X message TX operation) so as to decide (or determine) whether to maintain (or stop) a V2X message TX operation and/or whether to perform "V2X communication" (and/or "V2X message TX operation") on (the changed) different resource (or channel/band) (for a pre-set (or signaled) predetermined period of time) according to a pre-defined (or signaled) rule (or a priority). Herein, for example, the P-UE(s) does not need to (directly) make an attempt t detect "SLSS (sequence (or ID)) (or PSBCH)". Herein, for example, the term "SLSS" may be understood as "PSSS" (or "SSSS").

In yet another example, in the case of a P-UE(s) having the above-described a "(limited) capability (or chain/circuit)" (e.g., the "limited sensing_UE" form, "TYPE #B_UE" form, and "limited RX chain/circuit" form (or the form which has only "no RX chain/circuit" form or "TX chain/circuit")), when the P-UE(s) performs "partial sensing" operation to detect (or discover) "another communication" (e.g., "DSRC/IEEE 802.11P service", "(different numerology-based) new RAT (NR) eV2X service") (in a pre-set (or signaled) (time (or frequency) resource) section), an (adjacent) different V2X UE(s) (e.g., "V-UE(s)) (and/or a (serving) base station (or RSU)) may omit (V2X communication-related) channel/signal transmission in the (pre-set or (signaled)) "partial sensing" (time (or frequency))

resource section (in order to increase a probability of detecting "another communication" when the "partial sensing" operation" is performed).

In yet another example, (A) a type (or kind) of sensing operation (e.g., "partial sensing") that a P-UE(s) performs (having a limited RX (or TX) circuit capability) performs may be set (or signaled), and/or (B) a "SLSS transmission (or reception (or monitoring)) (performing) condition" may be set (or signaled) depending on whether or not random selection (of a transmission resource) is performed (without sensing operation).

In yet another example, in the case of a P-UE(s) (having a limited RX (or TX) circuit capability), the following (some) parameters may be set (or signaled) differently (or independently), compared with a V-UE(s).

(Example #1) The limited number of resources (with a resource reservation (interval) period) assumed (or used) for transmission resource (re)reservation (or selection) (and/or a proposed coexistence method (of the present invention): Cresel value in Section 2.1. of Table 2 (e.g., "[10*SL_RESOURCE_RESELECTION_COUNTER]")).

(Example #2) A V2X message priority (e.g., which may be set (or signaled) with a relatively low (or high) priority), and/or a "PSSCH-RSRP measurement" threshold value on the proposed coexistence method (in the present invention): STEP 5 of Section 2.3. of Table 2 (which may be understood as a "0.2*Mtotal"-related coefficient (or proportion) value on the proposed coexistence method (in the present invention): STEP 6 (or 8) of Section 2.3. of Table 2 (e.g., a proportion value for deriving (or determining) the minimum number of resources (candidates) (from among total resources (candidates)) to remain (in the SA set) after the proposed coexistence method (in the present invention): STEP 8 of Section 2.3. of Table 2 and/or as a proportion value for deriving (or determining the (minimum) number of resources (candidates) to remain in the SB set after the proposed coexistence method (in the present invention): STEP 8 of Section 2.3. of Table 2) (and/or a "PSSCH-RSRP measurement" increased value (e.g., "3DB") applicable when the minimum number of resources (candidates) (from total resources (candidates)) to remain in the SA set after the proposed coexistence method (in the present invention): STEP 5 of Section 2.3. of Table 2 is not satisfied, (and/or a period value used for sensing operation (e.g., the proposed coexistence method (in the present invention): STEP 5 of Section 2.3. of Table 2) (and/or energy measurement operation (e.g., the proposed coexistence method (in the present invention): STEP 8 in Section 2.3. of Table 2). Herein, for example, (that is) the above-described example of signaling a (partial) sensing pattern of a P-UE by a network may be applicable).

(Example #3) A I-VALUE (range) value and/or a P_STEP value which are selectable (or allowable) on a V2X resource pool (and/or (V2X) carrier)

(Example #4) A transmission ower-related (open-loop) parameter (or value) (e.g., "PO", "ALPHA", etc), and/or a V2X resource pool (or carrier).

In another example, with reference to the following Table 6, "V2X message transmission operation" (and/or "(transmission) resource selection (or reservation) operation" of a P-UE(s) (having a limited RX (or TX circuit capability) may be efficiently supported.

TABLE 6

| |
|---|
| 4. Example of a method of efficiently supporting "V2X message transmission operation" of a P-UE(s) (having a limited RX (or TX) circuit capability) (and/or "(transmission) resource selection (or reservation) operation") |
| 4.1. Precondition for random resource selection by P-UE |
| According to the present invention, P-UE including every P-UE having no sidelink Rx capability is able to support every posibility of using random selection. |
| If the P-UE selects random selection, only a pool where the random selection by the P-UE is allowed may be used for the random selection. |
| Whether a pool where the random selection by the P-UE is allowed to overlap with a different pool may depend on network configuration. |
| A possibility of setting pools where random selection by P-UEs is allowed may be supported. |
| According to the present invention, a possibility for a P-UE to use partial sensing in a sub set of a subframe is supported. |
| Partial sensing by a P-UE may be on the basis of V2V sensing-based resource selection. In this case, resource selection according to partial sensing by the P-UE may be similar to V2V sensing-based resource selection. |
| In the case of a P-UE having a sidelink Rx function, whether or not partial sensing support is essential may be considered. |
| 4.2. Method for supporting random resource selection in V2P |
| The current sidelink TX mode 4 is based on resource reservation (that is, using the same time/frequency resource with respect to several TB transmissions). Random resource selection by a P-UE will skip a sensing procedure, and thus, whether or not a randomly selected resource is maintained for a specific period of time needs to be considered. Applying reservation operation to the random resource selection may have an advantage and a disadvantage, as below. |
| Advantage: Although a P-UE does not perform detection, a resource reserved by the P-UE may be monitored by a V-UE and it is possible to avoid collision in resource selection by the V-UE. |
| Disadvantage: When a P-UE selects a non-preferred resource (e.g., a resource used by an adjacent UE or a resource experiencing strong in-band emission from transmission by a different UE. |
| The advantage and disadvantage of applying resource reservation to random selection depend on whether or not P-UE transmission and V-UE transmission share the same pool. When a random selection-allowed resource pool does not overlap with a resource pool used for V-UE transmission, no UE is able to take an advantage of resource reservation, and thus, there is no advantage of applying the resource reservation. |
| Therefore, random selection without resource reservation needs to be supported in the present invention. For this, whether or not it is necessary to additionally support random selection through resource reservation may be considered. |

TABLE 6-continued

| |
|---|
| Proposal 1: At least random selection without resource reservation may be supported in the present invention. For this, whether or not it is necessary to additionally support random selection through resource reservation may be considered. |
| In addition, how resource reselection is performed in a random resource selection procedure may be considered. To avoid consistent selection of an unsuitable resource, it is necessary to allow a P-UE to change a resource (that is, selecting a different resource other than an existing selected resource) in the reselection procedure. More specifically, the P-UE may exclude a subframe used in transmission of a previous TB, and thus, the impact of in-band emission between TB transmissions may be randomized. |
| Proposal 2: A P-UE may exclude a subframe used in transmission of a previous TB, and thus, the impact of in-band emission may be randomized through TB transmission. |
| A TX capability of the P-UE may be considered as well. Since the P-UE is able to transmit one message every second, the usage rate of a transmission chain on a PCC5 carrier for V2P may be 0.2% at the maximum. Thus, when it is necessary for every P-UE to have a transmission chain dedicated for V2P transmission, it may unnecessarily increase costs for UE implementation. Similarly to 3GPP Rel-12/13 D2D, a ProSe gap is used for P-UE transmission and thus a chain used for UL transmission may be borrowed temporally. |
| Proposal 3: A P-UE may temporally switch a transmission chain used for UL transmission to be used as an SL transmission chain. |
| 4.3. Conclusion |
| Proposal 1: At least random selection without resource reservation may be supported in the present invention. For this, whether or not it is necessary to additionally support random selection through resource reservation may be considered. |
| Proposal 2: A P-UE may exclude a subframe used in transmission of a previous TB, and thus, the impact of in-band emission between TB transmissions may be randomized. |
| Proposal 3: A P-UE may temporally switch a transmission chain used for UL transmission to be used as an SL transmission chain. |

Hereinafter, for convenience of explanation, the above-described embodiments will be described with flowcharts. Hereinafter, for convenience of explanation, the same description applicable redundantly to the following drawings will be omitted. That is, the above-described embodiments may be applicable even to the following embodiments.

Figure 19:
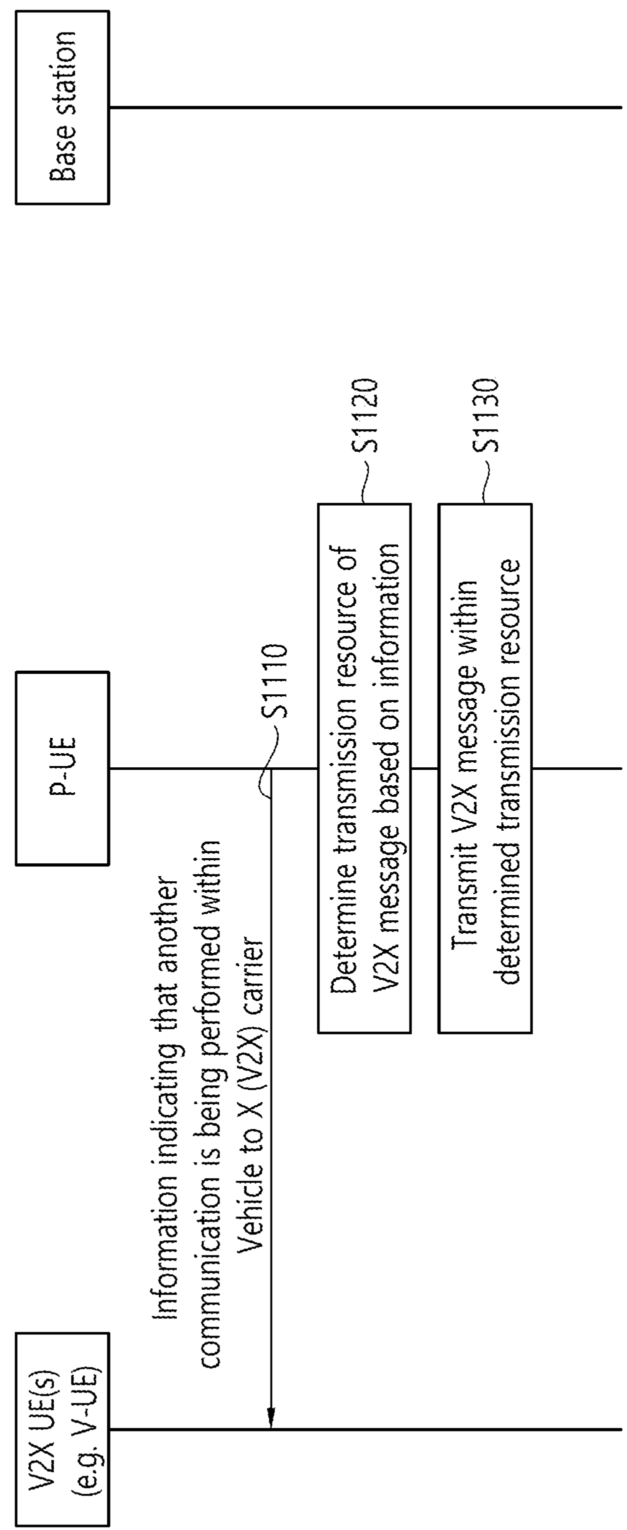
FIG. 19 is a flowchart of a method for transmitting a V2X message by a UE having a limited RX capability, according to another embodiment of the present invention.

FIG. 19 is a flowchart of a method for transmitting a V2X message by a UE having a limited RX capability, according to another embodiment of the present invention.

Referring to FIG. 19, a UE may receive, from a different V2X UE, information indicating that another communication is implemented (or detected) on a V2X carrier (S1110). In this case, the different V2X UE may be a V-UE.

For example, as described above, receiving the information indicating that another communication is implemented (or detected) on a V2X carrier may be providing (to a P-UE(s)) (through a pre-set (or signaled) channel) information on "type (or description) of an ITS service" which is (currently) operating (or detected) and/or "whether or not it is PS (or non-PS) service" (and/or whether or not "another communication (e.g., "DSRC/IEEE 802.11P service", "(different numerology-based) NR eV2X service" exists), etc. Detailed description of this embodiment is the same as described above and thus it is herein omitted.

Next, on the basis of the information, the UE may determine to transmit a V2X message (S1120).

For example, on the basis of the information, a rule may be defined for the P-UE(s) (A) to stop "V2X communication" on an existing pool (or carrier/channel/band) (and/or "V2X message TX operation") and/or (B) to (change a pool (or carrier/channel/band), on which "V2X communication" is being implemented, according to a pre-defined (or signaled) rule (priority) and/or) perform "V2X communication" on a (corresponding changed) different pool (or carrier/channel/band) (for a pre-set (or signaled) predetermined period of time) (and/or "V2X message TX operation"). Detailed description about this example is the same as described above, and thus, it is herein omitted.

In addition, for example, in the case of a P-UE(s) (having a limited RX (or TX) circuit capability), (some) parameters may be set (or signaled) differently (or independently), compared with a V-UE(s). Detailed description about this example is the same as described above, and thus, it is herein omitted.

In addition, for example, it is possible to efficiently support "V2X message transmission operation" (and/or "(transmission) resource selection (or reservation) operation" of a P-UE(s) 9having a limited RX (or TX) circuit capability). Detailed description about this example is the same as described above, and thus, it is herein omitted.

Then, the UE may transmit the V2X message on the determined transmission resource (S1130). A specific example in which the UE transmits the V2X message on the determined transmission resource is the same as described above.

Figure 20:
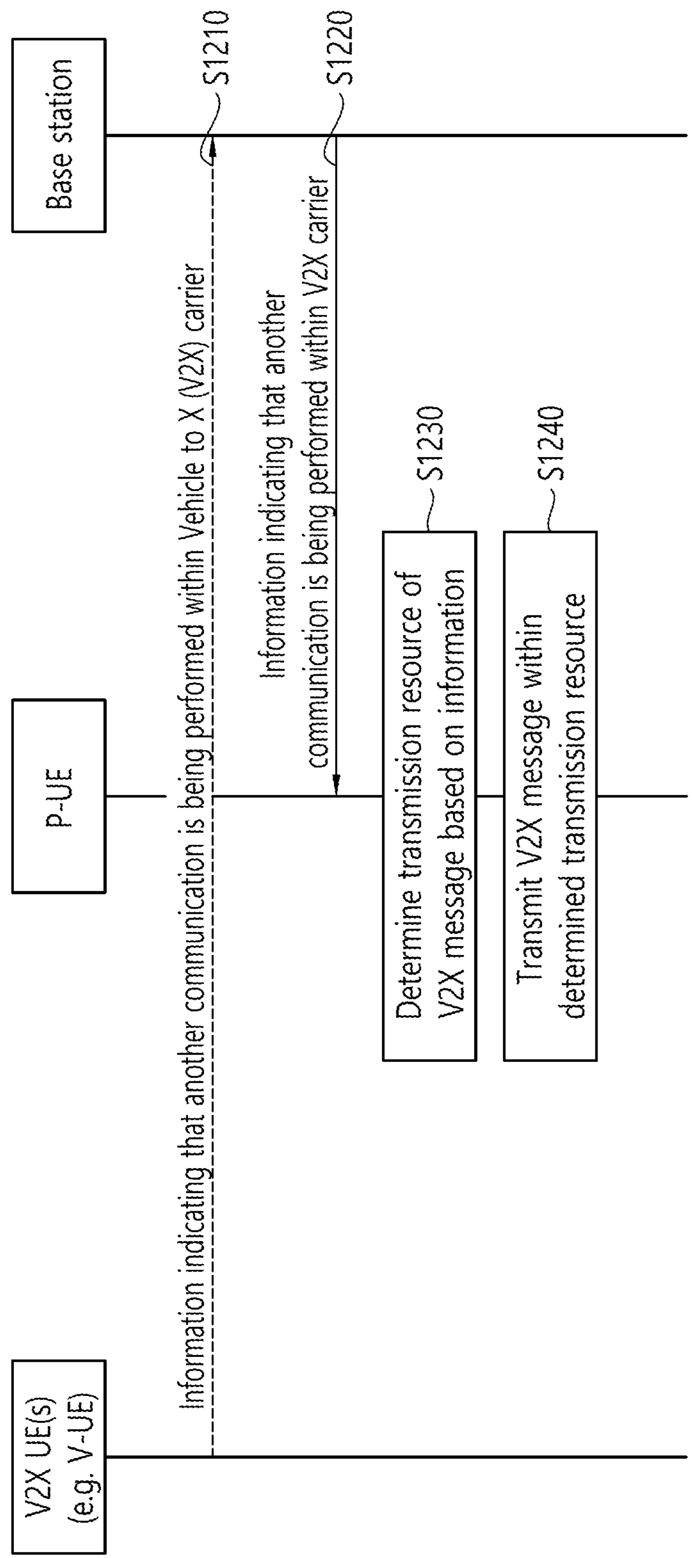
FIG. 20 is a flowchart of a method of transmitting a V2X message by a UE having a limited RX capability, according to another embodiment of the present invention.

FIG. 20 is a flowchart of a method of transmitting a V2X message by a UE having a limited RX capability, according to another embodiment of the present invention.

Referring to FIG. 20, a base station may receive, from a V2X UE (different from a P-UE) information indicating that another communication is implemented (or detected) on a V2X carrier (S1210). In this case, as described above, the different V2X UE may be a V-UE.

For example, as described above, receiving the information indicating that another communication is implemented (or detected) on a V2X carrier may be providing (to a P-UE(s)) (through a pre-set (or signaled) channel) information on "type (or description) of an ITS service" which is (currently) operating (or detected) and/or "whether or not it is PS (or non-PS) service" (and/or whether or not "another communication (e.g., "DSRC/IEEE 802.11P service", "(different numerology-based) NR eV2X service") exists), etc. Detailed description of this embodiment is the same as described above and thus it is herein omitted.

In addition, for example, when transmitting (or reporting), to a (serving) base station, information on "type (or description) of an ITS service" which is discovered (or detected) and (currently) operating, and/or "whether or not it is "PS (or non-PS) service", and/or whether or not "another communication (e.g., "DSRC/IEE 80211P service", "(different numerology-based) NR 2 V2X service") exists, a different V2X UE(s) (e.g., "V-UE(s)) (which is located around a P-UE(s)) may transmit the information together (additionally) with "its location information" (and/or "information on a location at which the corresponding information is discovered") (and/or a resource pool (or carrier/channel/band) (index) (information) in which ("location-based resource pool (TDM (or FDM)) separation is set (or signaled)) "another communication (and/or "ITS service" and/or "PS (or Non-PS) service") is detected. Detailed description about this example is the same as described above, and thus, it is herein omitted.

The UE (which is a UE other than the different V2X UE, for example, a P-UE) may receive, from a base station, the information indicating that another communication is implemented (or detected) on a V2X carrier (S1220). That is, the UE may receive, from the base station, forwarded information indicating that another communication is implemented (or detected) on a V2X carrier transmitted by the different V2X UE. Alternatively, the UE may receive, from the base station, information indicating that another communication is implemented (or detected) on a V2X carrier generated by the base station.

For example, as described above, receiving the information indicating that another communication is implemented (or detected) on a V2X carrier may be providing (through a pre-set (or signaled) channel) (to a P-UE(s)) information on "type (or description) of an ITS service" which is (currently) operating (or detected), and/or "whether or not it is "PS (or non-PS) service", and/or whether or not "another communication (e.g., "DSRC/IEE 80211P service", "(different numerology-based) NR 2 V2X service") exists. Detailed description about this example is the same as described above, and thus, it is herein omitted.

Then, on the basis of the information, the UE may determine whether to transmit a V2X message (S1230).

For example, on the basis of the information, a rule may be defined for the P-UE(s) (A) to stop "V2X communication" on an existing pool (or carrier/channel/band) (and/or "V2X message TX operation") and/or (B) to (change a pool (or carrier/channel/band), on which "V2X communication" is implemented, according to a pre-defined (or signaled) rule (priority) and/or) perform "V2X communication" on a (corresponding changed) different pool (or carrier/channel/band) (for a pre-set (or signaled) predetermined period of time) (and/or "V2X message TX operation"). Detailed description about this example is the same as described above, and thus, it is herein omitted.

In addition, for example, in the case of a P-UE(s) (having a limited RX (or TX) circuit capability), (some) parameters may be set (or signaled) differently (or independently), compared with a V-UE(s). Detailed description about this example is the same as described above, and thus, it is herein omitted.

In addition, for example, it is possible to efficiently support "V2X message transmission operation" (and/or "(transmission) resource selection (or reservation) operation" of a P-UE(s) 9having a limited RX (or TX) circuit capability). Detailed description about this example is the same as described above, and thus, it is herein omitted.

Then, the UE may transmit the V2X message on the determined transmission resource (S1240). A specific example in which the UE transmits the V2X message on the determined transmission resource is the same as described above.

In the case of PS service-related V2X transmission performed by a V2X UE (which moves relatively fast), WAN transmission may not be always prioritized over V2X transmission.

Regarding this, how to perform V2X transmission when WAN transmission and V2X transmission overlap in a time domain will be described with reference to drawings.

Figure 21:
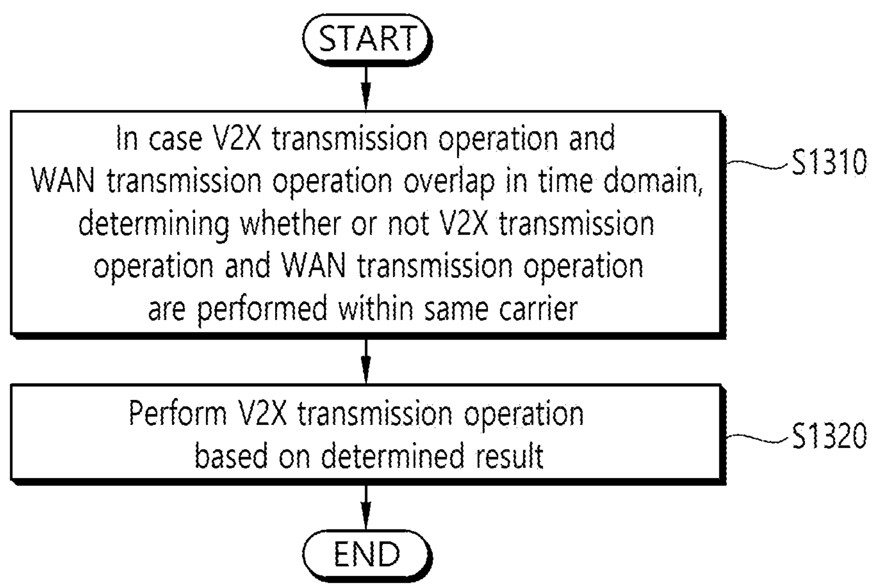
FIG. 21 is a flowchart of a V2X transmission method according to an embodiment of the present invention when WAN transmission and V2X transmission overlap in a time domain.

FIG. 21 is a flowchart of a V2X transmission method according to an embodiment of the present invention when WAN transmission and V2X transmission overlap in a time domain.

According to FIG. 21, when V2X transmission and WAN transmission overlap in a time domain, a UE may determine whether or not the V2X transmission and the WAN transmission are performed on the same carrier (S1310). In this case, the UE may be the above-described V2X UE.

Then, the UE may perform the V2X transmission on the basis of the determination (S1320). More specifically, there will be provided detailed description about (A) a method for efficiently determining V2X transmission power by the UE when V2X transmission and WAN (UL) transmission (partially or entirely) overlap in a time domain on different carriers and/or (B) a method of prioritizing V2X transmission (which overlaps with WAN (UL) transmission in a time domain on the same (and/or different) carrier) over the WAN (UL) transmission.

Figure 22:
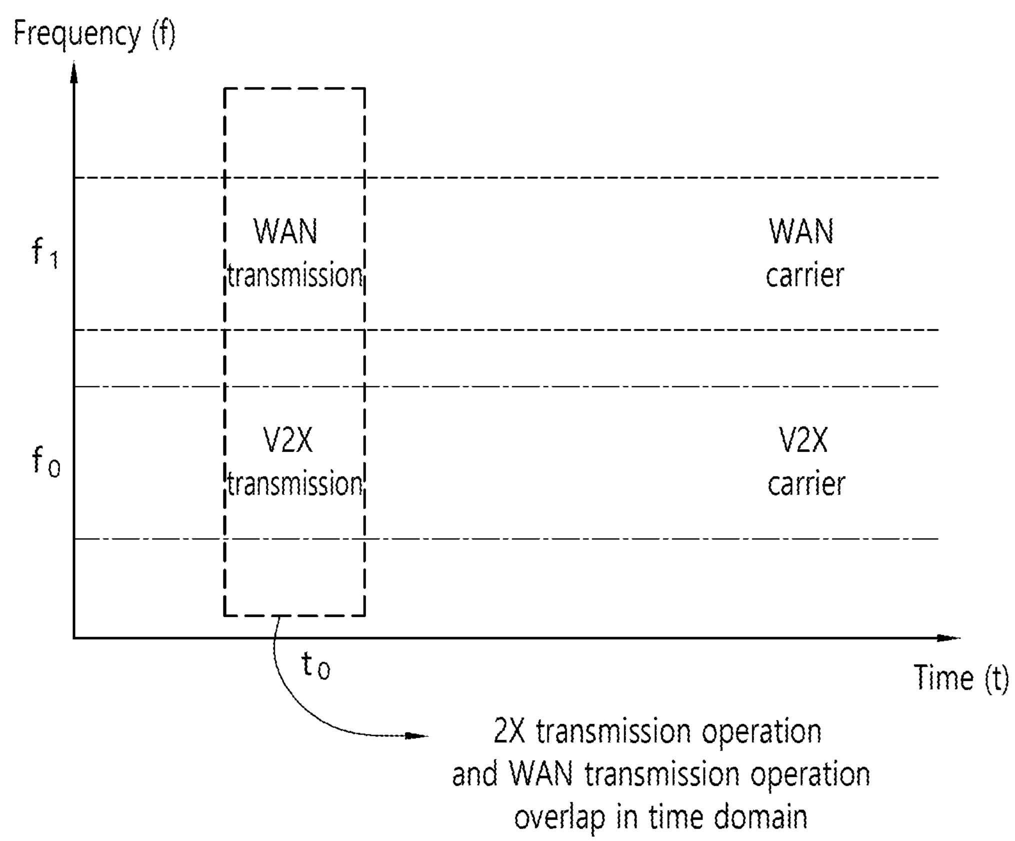
FIG. 22 schematically illustrates an example in which V2X transmission and WAN (UL) transmission (partially or entirely) overlap in a time domain on different carriers.

(A) Method for efficiently determining V2X transmission power by the UE when V2X transmission and WAN (UL) transmission (partially or entirely) overlap in a time domain on different carriers FIG. 22 schematically illustrates an example in which V2X transmission and WAN (UL) transmission (partially or entirely) overlap in a time domain on different carriers.

As illustrated in FIG. 22, a UE may perform V2X transmission on a V2X carrier having a frequency f0 at a time t0, and the UE may perform WAN transmission on a WAN carrier having a frequency f1 at the time t0.

When sidelink transmission by a UE on a subframe overlaps UL transmission by the UE in terms of time, the UE needs to adjust sidelink transmission power to prevent transmission power from exceeding PCMAX in an overlapping part.

Generally, according to D2D operation, when WAN TX and SL TX overlap on different carriers in terms of time, WAN TX may be prioritized over SL TX in terms of power allocation.

In other words, in the case of the D2D operation, when WAN TX and the SL TX are performed at the same time on different carriers or at an overlapping time, a UE may allocate more power to the WAN TX (than the SL TX). However, as described above, in the case of V2X transmission performed by a V2X UE which moves relatively fast, more urgent transmission is required often compared to the D2D transmission, and thus, the WAN transmission may not be always prioritized over the V2X transmission.

Accordingly, the following embodiment may be provided to solve the above-described problem.

Figure 23:
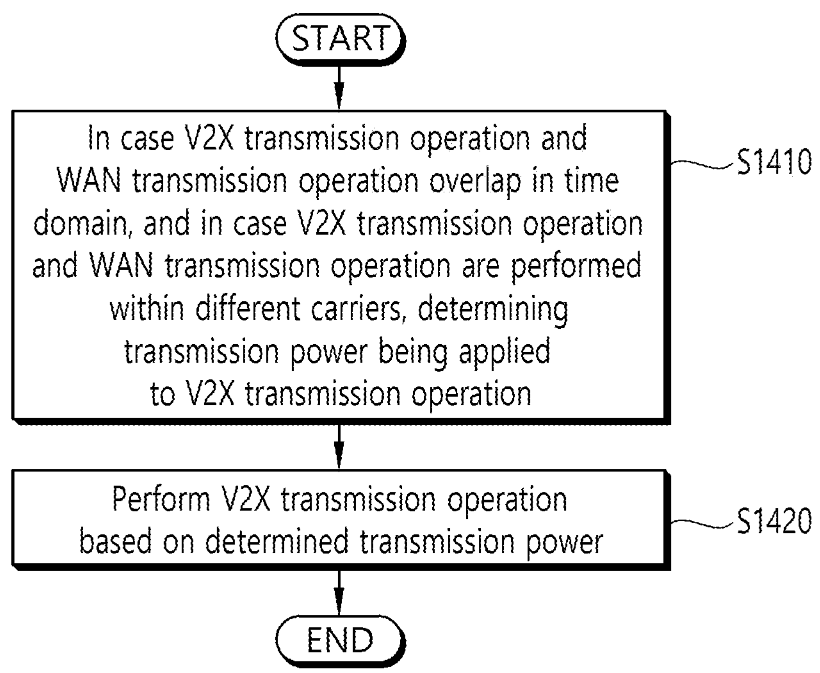
FIG. 23 is a flowchart of a V2X transmission method according to another embodiment of the present invention in the case where WAN transmission and V2X transmission overlap in a time domain.

FIG. 23 is a flowchart of a V2X transmission method according to another embodiment of the present invention in the case where WAN transmission and V2X transmission overlap in a time domain.

Referring to FIG. 23, when V2X transmission and WAN transmission overlap in a time domain and when the V2X transmission and the WAN transmission are performed on different carriers, a UE may determine transmission power required for the VX transmission (S1410). The UE may be a V2X UE. More specifically, the following options may be provided.

Under the following options, by assigning a higher priority to a V2V TX (than WAN TX) when it comes to power allocation, it is possible to efficiently prevent degradation of V2V performance.

In this case, for example, when V2V TX occurs in a set time domain such as "V2V gap" or when V2V TX with a (pre)set ProSe priority per packet (PPP) is performed, the following options may be applied limitedly. In addition, according to the following Option 2, solutions (or procedures) for dual connection may be reused.

Option 1: Power is first allocated to V2V TX and remaining power is allocated to WAN TX.

Option 2: Minimum power for V2V TX is guaranteed.

Herein, for example, (from the perspective of a specific (single) V2V UE), when V2X message TX and WAN UL TX (partially and/or entirely) overlap in a time domain on different (and/or same) carriers (or frequencies), the following (some) rules are applied, and therefore, performance of V2V message TX (having a relatively high PPPP) and/or a (relatively important) WAN UL TX (e.g., PUCCH (or PRACH) (or PUSCH/SRS)) may be guaranteed (as much as possible).

Herein, for example, the following (some) rules may be applied only in the case where (time) synchronization difference between V2X message TX and WAN UL TX is greater than a pre-set (or signaled) threshold value.

(Example #1) "Guaranteed minimum power (G_MINPOWER)" may be set (or signaled) on V2V message TX (equal to or greater than a pre-set (or signaled) PPPP threshold value) and/or WAN UL TX (of a pre-set (or signaled) channel (or signaled)).

Herein, for example, applying the pre-set (or signaled) G_MINPOWER value to WAN UL TX (and/or V2X message TX) may be available only when a PPPP value of V2X message TX which overlaps (partially or entirely) (in a time domain) is greater than a pre-set (or signaled) threshold value (e.g., when the PPPP value of V2X message TX is smaller than the pre-set (or signaled) threshold value, power allocation to WAN UL TX is prioritized) (and/or when a sum of a (required) V2X message TX power value and a (required) WAN UL TX power value exceeds a UE's maximum transmission power value (e.g., "23 DBM").

Herein, for example, a G_MINPOWER value relating to WAN UL TX (and/or V2X message TX) may be set (or signaled) differently (or independently) for each PPPP value of V2X message TX (which overlaps (partially or entirely) (in a time domain)).

(Example #2) When a PPPP value of V2X message TX which overlaps (partially or entirely) (in a time domain) is greater than a pre-set (or signaled) threshold value, WAN UL TX may be omitted (e.g., when the PPPP value of V2X message TX is smaller than the pre-set (or signaled) threshold value, V2X message TX is omitted).

Herein, for example, the corresponding rule may be applied limitedly in the case of WAN UL TX except for a pre-set (or signaled) (important) channel (or signal) (e.g., PUCCH (or PRACH) (or PUSCH/SRS)).

Herein, for example, in the case of the pre-set (or signaled) important channel (or signal) (e.g., PUCCH (or PRACH) (or PUSCH/SRS)), the above-described (Example #1) (e.g., G_MINPOWER) may be (exceptionally) applied (e.g., which may be understood that transmission of the (corresponding) (important) channel (or signal) is not allowed to be omitted) and/or V2X message TX may be (exceptionally) omitted.

The above description may be summarized as below.

Proposal: To put it briefly, the following two options may support prioritizing SL TX over WAN TX when it comes to power allocation.

(1) Option 1: First allocate power to V2V TX and remaining power to WAN TX (2) Option 2: Guarantee minimum power for V2V TX (B) More detailed method for prioritizing V2X transmission (which overlaps with WAN (UL) transmission in a time domain on the same (and/or different) carrier) over WAN (UL) transmission FIG. 24 illustrates an example of a method for prioritizing V2X transmission (which overlaps with WAN (UL) transmission on a time domain on the same (and/or different) carrier) over a WAN (UL) transmission.

Figure 24:
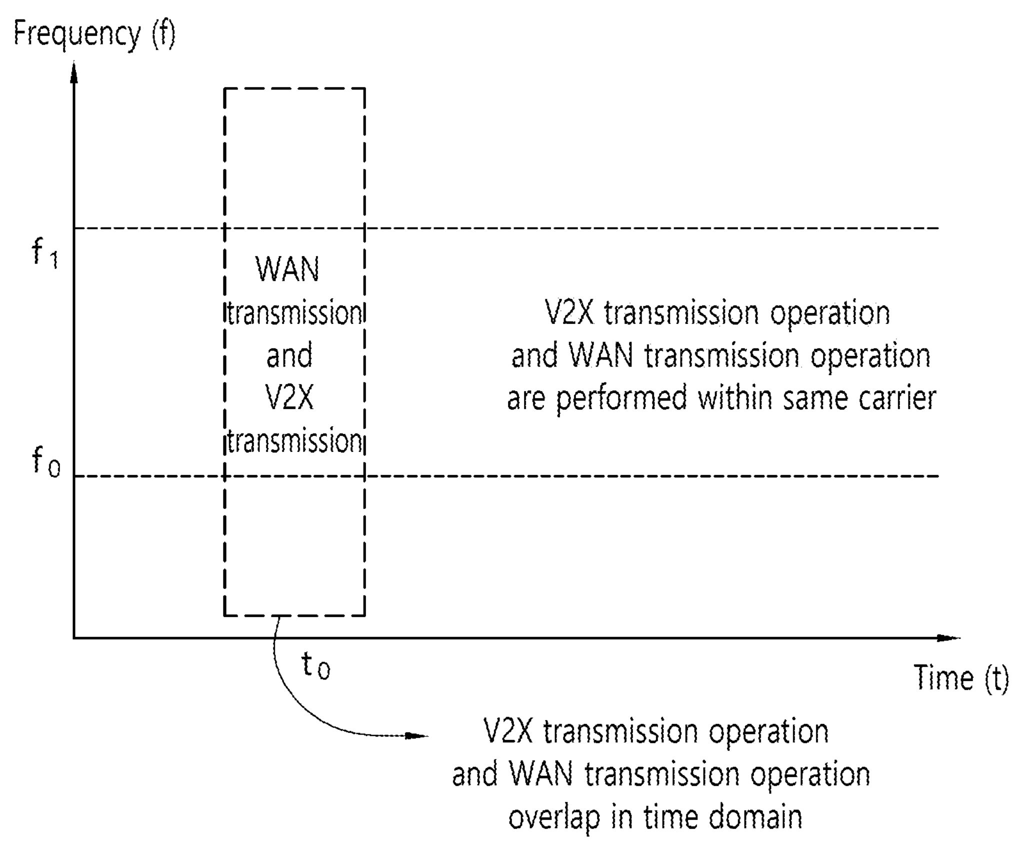
FIG. 24 illustrates an example of a method for prioritizing V2X transmission (which overlaps with WAN (UL) transmission on a time domain on the same (and/or different) carrier) over a WAN (UL) transmission.

As illustrated in FIG. 24, a UE may perform V2X transmission and WAN transmission on the same carrier having a frequency of f0 at a time t0. FIG. 24 schematically illustrates the case of performing V2X transmission and WAN transmission on the same carrier for convenience of explanation, but the case of performing V2X transmission and WAN transmission on different carriers may be applicable in the following embodiment of the present invention.

Herein, the following description may be applied for the above-described coexistence of PC5-based V2V and WAN.

First, sidelink open loop power control may bere used for V2V-related SL.

In addition, SL TX for V2V may be prioritized over WAN TX. In this case, the above-described SL TX for V2V may apply the above-described D2D operation (e.g., Mode 1 and/or Mode 2). Herein, a priority may be managed by a base station (eNB).

In addition, the same receiver function of a D2C communication UE may be assumed even for a V2V UE. That is, if a UE is configured to receive V2V, a RX chain may not affect WAN reception and may always receive a V2V signal.

Figure 25:
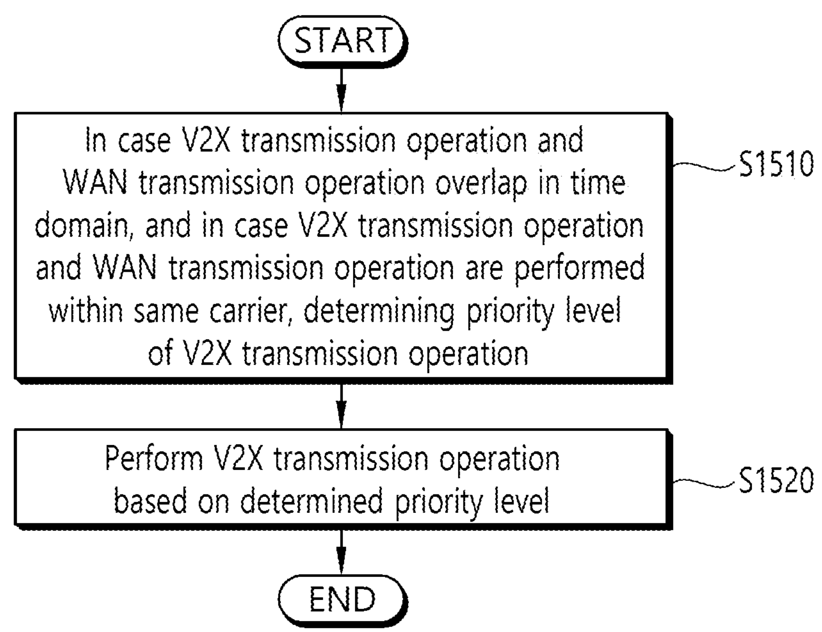
FIG. 25 is a flowchart of a V2X transmission method according to another embodiment of the present invention in the case where a WAN transmission operation and a V2X transmission operation overlap in a time domain.

Hereinafter, when WAN transmission and V2X transmission overlap in a time domain, a V2X transmission method will be described in more detail FIG. 25 is a flowchart of a V2X transmission method according to another embodiment of the present invention in the case where a WAN transmission operation and a V2X transmission operation overlap in a time domain.

Referring to FIG. 25, when a V2X transmission operation and a WAN transmission operation overlap in a time domain and when the V2X transmission operation and the WAN transmission operation are performed on the same carrier, a UE may determine a priority of the V2X transmission (S1510). In this case, the UE may be the above-described V2X UE. More specifically, options as below may be applicable.

For prioritization of SL TX through WAN TX, it is important to guarantee V2V performance of TM 4 in a common carrier case (that is, SL TX and WAN TX on the same carrier. As one possible option supporting this operation, reusing "ProSe gap" (e.g., a time period in which D2D TX set by a network is prioritized over WAN TX) together with additional modification optimized for a V2V traffic pattern may be considered.

In another example, always prioritizing V2V TX having a pre-defined PPPP over WAN TX may be considered. In other words, when V2V TX and WAN TX overlap on the same carrier in terms of time, V2V TX having another PPPP may be dropped.

Proposal: One of the following options may be selected to support prioritization of SL TX over WAN TX.

Option 1: After application of several required modifications (e.g., introduction of an additional period suitable for a V2V traffic pattern), "ProSe gap" related to Rel-13 eD2D may be reused. Herein, for example, in the corresponding gap ((time (or frequency) resource) region, a V2V (message) TX associated with a PPPP (or a pre-set (or signaled) specific PPPP) having a pre-set (or signaled) threshold value may be prioritized over WAN UL TX.

Option 2: V2V TX having a (pre) configured PPPP may be always prioritized over WAN TX.

In conclusion, the above descriptions may be summarized as below.

Proposal: One of the following options may be selected to support prioritization of SL TX over WAN TX.

(1) Option 1: After application of several required modifications (e.g., introduction of an additional period suitable for a V2V traffic pattern), "ProSe gap" related to Rel-13 eD2D search may be reused.

(2) Option 2: V2V TX having a (pre) configured PPPP may be always prioritized over WAN TX.

In another example, in the case of a P-UE(s), whether to (lastly) perform selection (or switching) between "(partial) sensing-based resource selection behavior (or pool)" and "random resource selection behavior (or pool)" may be determined depending on whether "congestion level" (measured (directly) by the P-UE(s) or received from a different V2X entity (e.g., a (serving) base station, and a V-UE(s))).

Herein, for example, if the "congestion level (which is measured (directly) by the P-UE(s), performing "(partial) sensing-based resource selection behavior (or pool)", or which is received from a different V2X entity) exceeds the pre-set (or signaled) threshold value, "random resource selection behavior (or pool)" may be performed (or used).

Examples of the above-described proposed methods may be included as one of methods implemented by the present invention, and thus, it is obvious that they can be considered as a kind of proposed methods. In addition, the above-described proposed methods may be implemented independently or may be implemented in a combination (or integration) of some proposed methods.

For example, in the present invention, a proposed method is described based on a 3GPP LTE system for convenience of explanation, but the range of systems to which the proposed method is applicable may include other systems in addition to the 3GPP LTE system.

For example, the proposed methods of the present invention may be applicable even to D2D communication. Herein, for example, the D2D communication indicates communication in which a UE communicates directly with a different UE, and, herein, for example, the UE is a user's terminal, but it may be considered a kind of UE when a network device such as a base station transmits/receives a signal according to a method for communication between UEs.

In addition, for example, the proposed methods of the present invention may be applicable limitedly only in Mode 2 V2V operation (and/or Mode 1 V2X operation).

In addition, for example, the proposed methods of the present invention may be applicable not just to a P-UE(s) having a limited RX (or TX) circuit capability, but to a Vehicle UE(s) (V-UE(s)) (and/or a P-UE(s) having a non-limited RX (or TX) circuit capability).

In addition, for example, the proposed methods of the present invention may be applicable even when WAN UL TX and V2X message TX (partially) overlap in a time domain on different carriers.

In addition, for example, the proposed methods of the present invention may be applicable even when a P-UE (having a limited RX (or TX) circuit capability) performs "partial sensing operation" (on (some) resource sections (or regions) within a "sensing gap (or resource) received from a network (or base station) (or a RX gap (or resource) or a partial sensing gap (or resource))" and/or when the P-UE(s) (independently) performs "partial sensing operation" in a set (or designated) (some) resource section (or region) without receiving corresponding relevant information.

In addition, for example, the proposed methods of the present invention may be applicable limitedly only when a P-UE(s) (having a limited RX (or TX) circuit capability) performs "partial sensing" (and/or performs "full-sensing" operation (based transmission resource selection) (and/or randomly select a transmission resource (without a sensing operation)).

In addition, for example, the proposed methods of the present invention may be applicable limitedly only when V2X message Tx and WAN UL TX (partially and/or entirely) overlap in a time domain on different (and/or same) carriers (or frequencies) (from the perspective of a specific (single) V2X UE).

Figure 26:
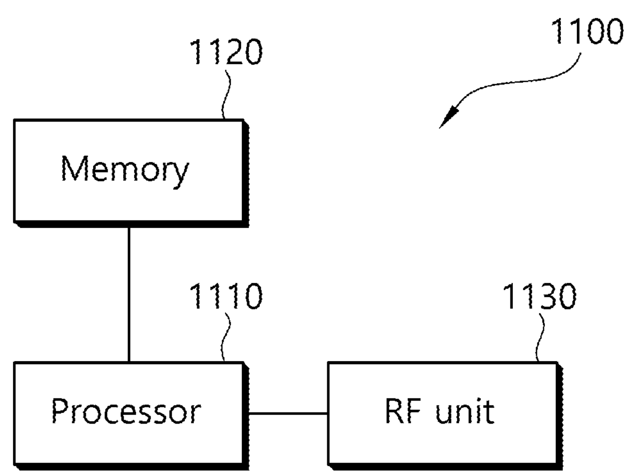
FIG. 26 is a block diagram of a UE that implements an embodiment of the present invention.

FIG. 26 is a block diagram of a UE that implements an embodiment of the present invention.

Referring to FIG. 26, a UE 1100 includes a processor 1110, a memory 1120, and a Radio Frequency (RF) unit 1130.

According to one embodiment, the processor 1110 may implement functions/operations/methods described in the present invention. For example, the processor 1110 may receive pattern information used to determine a sensing pattern, and sense some subframes determined from among subframes in a sensing window on the basis of the pattern information, and select a specific subframe in the selection window as a V2X transmission subframe on the basis of the sensing.

The RF unit 1130 is connected with the processor 110, and transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method implemented by a user equipment (UE) in a wireless communication system, the method comprising:

identifying whether or not a vehicle-to-everything (V2X) transmission operation and an uplink transmission operation overlap in a time domain;

allocating transmission power to at least one of the V2X transmission operation or the uplink transmission operation based on (i) whether or not the V2X transmission operation and the uplink transmission operation are performed on a same carrier and (ii) whether or not a priority value related to the V2X transmission operation is greater than a threshold value; and performing the V2X transmission operation based on the allocated transmission power, wherein, in case that the priority value is greater than the threshold value, transmission power is first allocated to the V2X transmission operation, and wherein, in case that the priority value is smaller than the threshold value, transmission power is first allocated to the uplink transmission operation.

2. The method of claim 1, wherein, in case that the V2X transmission operation and the uplink transmission operation are performed on different carriers, the UE first allocates transmission power to the V2X transmission operation and then allocates remaining power transmission power to the uplink transmission operation.

3. The method of claim 1, wherein, in case that the V2X transmission operation and the uplink transmission operation are performed on different carriers and a ProSe per packet priority (PPPP) of a V2X message transmitted in the V2X transmission operation is greater than a threshold value, the UE first allocates transmission power to the V2X transmission operation.

4. The method of claim 1, wherein, in case that the V2X transmission operation and the uplink transmission operation are performed on different carriers and a PPPP of a V2X message transmitted in the V2X transmission operation is smaller than a threshold value, the UE first allocates transmission power to the uplink transmission operation.

5. The method of claim 1, wherein, in case that the V2X transmission operation and the uplink transmission operation are performed on different carriers and a PPPP of a V2X message transmitted in the V2X transmission operation is greater than a threshold value, the UE allocates transmission power only to the V2X transmission operation and omits allocating transmission power to the uplink transmission operation.

6. The method of claim 1, wherein, in case that the V2X transmission operation and the uplink transmission operation are performed on different carriers and a PPPP of a V2X message transmitted in the V2X transmission operation is smaller than a threshold value, the UE allocates transmission power only to the uplink transmission operation and omits allocating transmission power to the V2X transmission operation.

7. The method of claim 1, wherein, in case that the V2X transmission operation and the uplink transmission operation are performed on the same carrier, the UE always prioritizes the V2X transmission operation.

8. The method of claim 1, wherein, in case that the V2X transmission operation and the uplink transmission operation are performed on the same carrier and a PPPP of a V2X message transmitted in the V2X transmission operation is greater than a threshold value, the UE prioritizes the V2X transmission operation.

9. The method of claim 1, wherein, in case that the V2X transmission operation and the uplink transmission operation are performed on the same carrier and a PPPP of a V2X message transmitted in the V2X transmission operation is smaller than a threshold value, the UE prioritizes the uplink transmission operation.

10. A user equipment (UE) configured to operate in a wireless communication system, the UE comprising:

a transceiver; and a processor coupled to the transceiver and configured to:

identify whether or not a vehicle-to-everything (V2X) transmission operation and an uplink transmission operation overlap in a time domain;

allocate transmission power to at least one of the V2X transmission operation or the uplink transmission operation based on (i) whether or not the V2X transmission operation and the uplink transmission operation are performed on a same carrier and (ii) whether or not a priority value related to the V2X transmission operation is greater than a threshold value; and perform the V2X transmission operation based on the allocated transmission power, wherein, in case that the priority value is greater than the threshold value, transmission power is first allocated to the V2X transmission operation, and wherein, in case that the priority value is smaller than the threshold value, transmission power is first allocated to the uplink transmission operation.

* * * * *